(12) United States Patent
Hsu et al.

(10) Patent No.: US 10,146,684 B2
(45) Date of Patent: Dec. 4, 2018

(54) DISTRIBUTED DATA PARALLEL METHOD FOR RECLAIMING SPACE

(71) Applicant: Datrium Inc., Sunnyvale, CA (US)

(72) Inventors: Windsor Hsu, San Jose, CA (US); R. Hugo Patterson, Los Altos, CA (US)

(73) Assignee: Datrium, Inc., Sunnyvale, CA (US)

(*) Notice: Subject to any disclaimer, the term of this patent is extended or adjusted under 35 U.S.C. 154(b) by 0 days.

(21) Appl. No.: 15/332,790

(22) Filed: Oct. 24, 2016

(65) Prior Publication Data

US 2018/0113804 A1    Apr. 26, 2018

(51) Int. Cl.
*G06F 12/02* (2006.01)
*G06F 3/06* (2006.01)

(52) U.S. Cl.
CPC .......... *G06F 12/0253* (2013.01); *G06F 3/064* (2013.01); *G06F 3/065* (2013.01); *G06F 3/067* (2013.01); *G06F 3/0608* (2013.01); *G06F 3/0631* (2013.01); *G06F 3/0643* (2013.01); *G06F 3/0673* (2013.01); *G06F 12/0261* (2013.01); *G06F 2212/1044* (2013.01)

(58) Field of Classification Search
CPC .. G06F 12/0253; G06F 3/0608; G06F 3/0652; G06F 2212/1044
See application file for complete search history.

(56) References Cited

U.S. PATENT DOCUMENTS

| | | | |
|---|---|---|---|
| 8,972,672 B1 | 3/2015 | Wallace et al. | |
| 9,317,218 B1 | 4/2016 | Botelho et al. | |
| 2007/0255909 A1* | 11/2007 | Gschwind | G06F 12/0269 711/147 |
| 2008/0005520 A1* | 1/2008 | Siegwart | G06F 12/0253 711/170 |
| 2009/0150613 A1* | 6/2009 | Wang | G06F 12/0261 711/117 |
| 2009/0327372 A1* | 12/2009 | Ylonen | G06F 12/0253 |
| 2010/0223441 A1 | 9/2010 | Lillibridge et al. | |
| 2012/0030260 A1* | 2/2012 | Lu | G06F 11/1453 707/820 |
| 2017/0153973 A1* | 6/2017 | Schatzl | G06F 12/0276 |
| 2018/0011787 A1* | 1/2018 | Karlsson | G06F 12/0253 |

OTHER PUBLICATIONS

European Patent Office, "Search Report" in application No. 17197879.4-1221, dated Mar. 2, 2018, 11 pages. European Claims in application No. 17197879.4-1221, dated Mar. 2018, 5 pages.

* cited by examiner

*Primary Examiner* — Hal Schnee
(74) *Attorney, Agent, or Firm* — Hickman Palermo Becker Bingham LLP

(57) ABSTRACT

Techniques for copying forward live data within storage regions used by a file system to new storage regions are provided. Storage regions refer to ranges of persistent storage within a storage medium. One or more live-clump-identifying workers identify a set of live-clump-references. The live-clump references are references to live clumps that belong to live objects. Live clumps represent a unit of data. After identifying the set of live-clump-references, one or more container-identifying workers identify a set of storage regions that contain clumps that correspond to the set of live-clump references. After identifying the set of storage regions corresponding to the set of live-clump-references, a plurality of copy-forward task workers perform copy-forward operations on the set of storage regions to copy live data to new storage regions.

30 Claims, 12 Drawing Sheets

DISTRIBUTED DATA PARALLEL METHOD FOR RECLAIMING SPACE

FIELD OF THE INVENTION

The present invention relates to reclaiming storage space occupied by data that is no longer used.

BACKGROUND

Electronic file systems store various types of objects, such as files and file metadata, in "clumps" of memory. As used herein, a "clump" is any range of contiguous memory. For example, in persistent storage devices, a clump may comprise a physically or logically contiguous set of disk blocks. When an object is initially stored in persistent storage, the file management system writes the data that makes up the object into specific clumps within persistent storage, and generates metadata for the data object. The metadata may, for example, map an object identifier of the object to the one or more clumps that store the data of the object. For example, if object file1.txt is stored in clumps a, b, and c, then the metadata for file1.txt would contain mapping information that maps the object identifier of file1.txt to clumps a, b, and c. The metadata that maps object identifiers to clumps is referred to herein as object-to-clump mapping information.

In some systems, a single clump may be mapped to multiple objects. This may occur, for example, when the file management system implements deduplication techniques. Deduplication is a compression technique for eliminating duplicate copies of data. For example, assume that a portion of file1.txt is identical to a portion of file2.txt. Under these circumstances, the data for that identical portion may be stored in a single clump, and the object-to-clump mappings of both file1.txt and file2.txt may point to that same clump. By allowing many-to-one relationships from objects to clumps, the file management system reduces the need to store duplicate copies of the same data. However, at the same time, many-to-one relationships from object to clumps complicate the process of storage reclamation. Specifically, when file1.txt is deleted, the clumps that were used by file1.txt cannot necessarily be reclaimed because one or more of those clumps may be pointed to by a different live object.

When accessing stored objects, the file management system refers to the object-to-clump mapping to determine which clumps belong to a specific object. Once the desired clumps are identified, the file management system accesses the clumps from persistent storage. When deleting and/or updating an object, the file management system removes the object-to-clump mapping between the object and the one or more clumps that contain the object's data, but does not reclaim those clumps. Consequently, the clumps that were mapped to an object are no longer reachable by applications through the object identifier of that object. However, in systems that support one-to-many mappings of object identifiers to clumps, those same clumps may still be reachable through the object identifiers of other objects. The technique of deleting only the object-to-clump mapping without reclaiming the clumps is efficient in that it only requires removing object-to-clump mappings. However, the clumps that are no longer in use have to eventually be reclaimed so that they may be used for new data.

As the objects of a file system are updated and deleted, the file system accumulates clumps that contain data that is no longer used by any software application (referred to herein as "dead data"). A clump that contains dead data is referred to herein as a "dead clump". For example, assume that an object O is initially stored in clumps A, B and C. If object O is updated, the updated version of object O may be written out to clumps X, Y and Z. In response to the update, the metadata that maps object O to clumps A, B and C is deleted, and metadata that maps object O to clumps X, Y and Z is created. Assuming that no other object is mapped to clumps A, B and C, clumps A, B and C will be dead after the update. That is, the data in clumps A, B and C is no longer in use by any software application. Effective storage management requires that those dead clumps be reclaimed so that the clumps may be reused to store new "live" data.

One technique for reclaiming dead clumps is referred to as the mark-and-sweep approach. The mark-and-sweep approach involves (a) identifying the objects that are currently "live" or "reachable" by software entities, (b) marking the clumps that store data for those objects as "live", and then (c) freeing up all clumps that are not marked as "live".

In some implementations, to reduce storage fragmentation, the live clumps within a logically or physically contiguous storage region are moved to a different location so that the entire contiguous storage region is made available for reuse. The process of moving the live clumps of a region to another location is referred to as a copy-forward operation.

As mentioned above, the first step of a mark-and-sweep approach involves identifying live clumps based upon whether a reference to a clump exists within the object-to-clump mapping metadata. Approaches to identifying live clumps include scanning the entire list of object-to-clump mapping, and marking all clumps within the object-to-clump mapping. Marking may include either generating a list of live clumps or setting a marked attribute within the clump itself. During the copy-forward operation, the reclamation process steps through all clumps stored within an area of persistent storage and, if a clump is marked as live, the clump is copied forward to the new area of persistent storage. Once all clumps within the area have been stepped through, the area is reallocated, since all live clumps have already been copied forward.

Unfortunately, the mark-and-sweep approach can consume a significant amount of compute and memory resources, especially when combined with copy-forward operations. For example, if the object-to-clump mapping is relatively large, then scanning the object-to-clump mapping for live clumps may take a considerable amount time to complete. As storage systems get larger, this approach takes more and more time to complete and becomes inefficient. Therefore, an efficient approach to determining live clumps and copying forward the live clumps to new areas of persistent storage is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for performing storage reclamation using parallelized mark-and-sweep and copy forward operations. According to one embodiment, storage reclamation is performed in a series of phases, each of which corresponds to a particular piece of work. During each of the phases, the corresponding piece of work is broken into independent tasks, and the tasks are distributed to available task workers. Because each task within a phase is independent of any other task within the phase, no coordination is required between the task workers to execute the tasks that belong to any given phase. Because each task within a phase is independent of any other task within the phase, when multiple task workers are available, the tasks that belong to any given phase can be performed in parallel so that the space reclamation can be performed significantly faster than with serial reclamation operations.

Structural Overview

Figure 1:
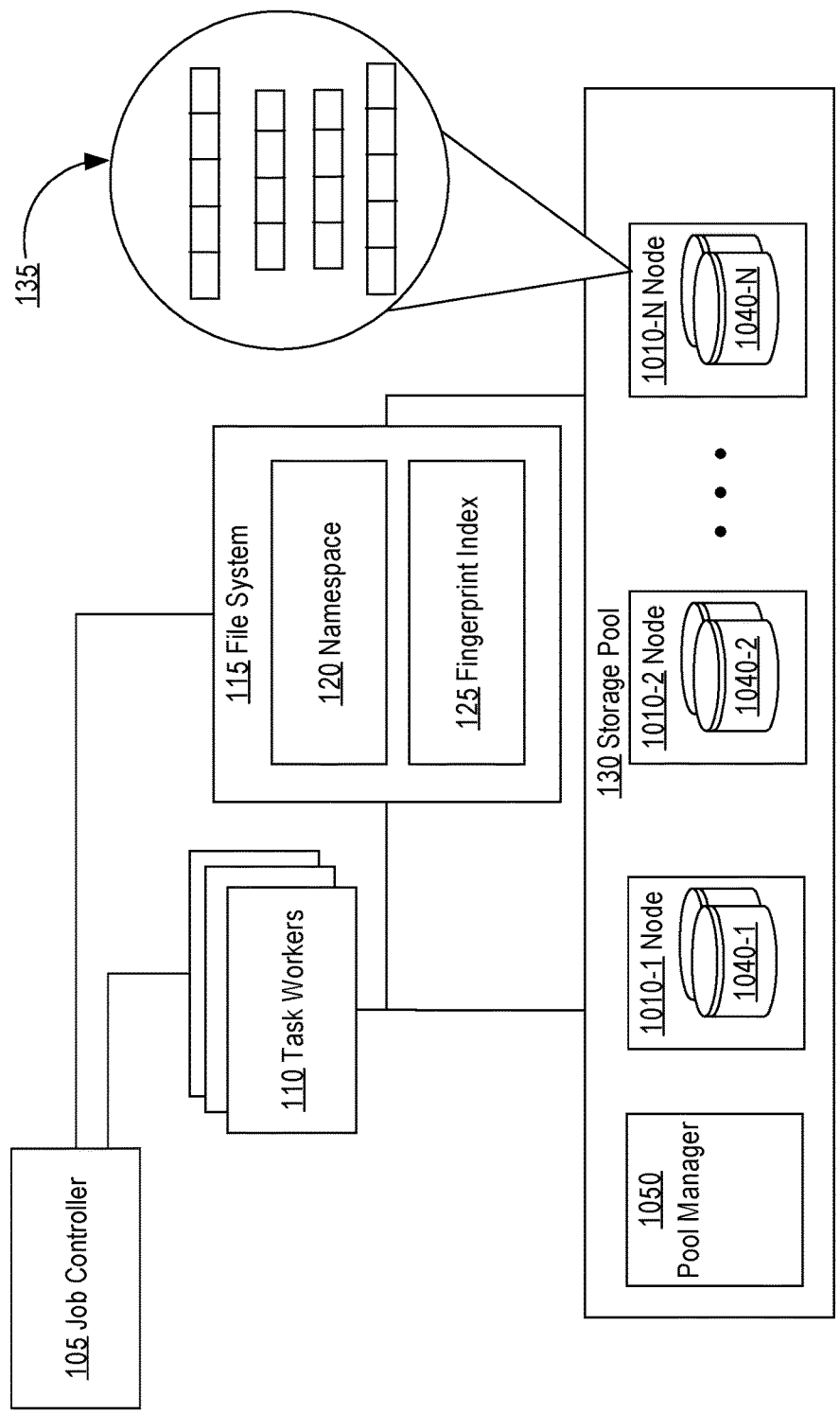
FIG. 1 depicts an embodiment of a distributed storage system including data management services for reclaiming storage space within a storage pool.

A distributed storage system typically has a collection of storage components including, but not limited to, a storage pool containing one or more storage nodes and a storage pool manager. FIG. 1 depicts a sample embodiment of a distributed storage system including data management services for reclaiming storage space within a storage pool 130.

In the embodiment illustrated in FIG. 1, storage pool 130 contains storage nodes 1010-1, 1010-2 . . . and 1010-N. Storage nodes 1010-1, 1010-2 . . . and 1010-N, in turn, contain storage devices 1040-1, 1040-2 . . . and 1040-N.

A file system 115 manages how data is organized within the storage pool 130. For example, the file system 115 may organize data as a log-structured file system within the storage pool 130. A log structured file system is a file system where data is sequentially written to one or more data logs. Each data log may include specific storage regions, herein referred to as containers.

A container may store multiple clumps based upon the configured size of the container. Referring back to FIG. 1, bubble 135 depicts data logs stored within the storage pool 130. Bubble 135 shows multiple data logs, each containing multiple containers. In other embodiments, the file system 115 may organize data using a different file structures on the storage pool 130. A detailed description of implementations of the file system structure, storage pools, and interconnectivity between hosts and virtual machines that may read, write, and update data is described in the DISTRIBUTED VIRTUAL ARRAY section herein.

File system 115 manages reads and writes of data to the storage pool 130 using namespace 120, file manager 122 and fingerprint index 125. The namespace 120 is implemented to keep track of the objects stored in the file system. The file manager 122 is implemented to organize objects and their associated clumps. In an embodiment, the namespace 120 includes metadata containing object name to object mapping and the file manager 122 includes metadata containing object-to-clump mapping that is used to identify which clumps are associated with which object. A clump reference is a unique identifier for a specific clump within a specific container. Embodiments of clump references include, but are not limited to, pointers to a specific memory location within persistent storage, or primary keys used to look up mapped memory addresses within persistent storage. In an embodiment, fingerprint index 125 contains a clump-reference-to-container-identifier mapping used to map the clump reference to a particular location within a particular container. In an embodiment, the clump references may be represented using a unique data fingerprint value called a clump fingerprint. Clump fingerprints are identifiers associated with each clump that uniquely identify a specific clump. In one embodiment, the clump fingerprint is computed based on a cryptographic hash of the data in the clump.

When reading, writing, and/or updating clumps for a particular object, the file system 115 accesses the file manager 122 to determine the clump fingerprints mapped to the particular object and then accesses the fingerprint index 125 to determine the location of the clumps, based on the clump fingerprints, within the data logs stored on the storage pool 130.

The Job Controller

In an embodiment, space reclamation may be accomplished using a space reclamation job that reclaims storage space from existing containers by moving live clumps to new containers created within a data log. Job controller 105 represents a component that is configured to coordinate and manage space reclamation operations. In an embodiment, the job controller 105 may be implemented on a server that is communicatively coupled to the storage pool 130. In another embodiment, the job controller 105 may be implemented as software running on a storage node, which is configured to manage one or more storage devices within the storage pool 130. The job controller 105 manages reorganizing storage of clumps within storage nodes within the storage pool 130. The job controller 105 may communicate with the file system 115 and the storage pool 130 to determine when to initiate the space reclamation job and to determine which containers should be targeted for space reclamation.

In an embodiment, the job controller 105 delegates different phases of the space reclamation job to task workers 110. For example, if after determining that the space reclamation job should be initiated, the job controller 105 may assign tasks for each phase of the space reclamation job to the task workers 110. A task worker may represent a process or thread configured to perform a task related to the space reclamation job. In an embodiment, the task workers 110 may represent processes or threads, which may run in parallel, implemented on specific storage nodes within the storage pool 130. In an embodiment, task workers 110 located on specific storage nodes receive tasks related to clumps stored within their corresponding storage node.

In another embodiment, the task workers 110 may represent processes or threads implemented on a pool manager 1050. In this case, when tasks are assigned to the task workers 110 the task workers 110 establish connections to the specific storage nodes associated with each assigned task. In yet another embodiment, the task workers 110 may represent processes or threads implemented on host devices that may host an application that requests reads and writes to the file system 115. In other embodiments, task workers 110 may represent processes or threads implemented at multiple locations and the job controller 105 assigns tasks to the task workers 110 which, then perform the tasks by communicating to local and/or remote storage nodes.

In an embodiment, upon completion of all the tasks associated with a specific phase in the space reclamation job, the job controller 105 distributes new tasks associated with the next phase in the space reclamation job to another set of available task workers 110. The process of distributing tasks for each phase is managed by the job controller 105 until all phases are complete. Distribution techniques of tasks for each phase of the space reclamation job and management of the task workers 110 are discussed in greater detail hereafter.

The job controller 105 is configured to determine when to schedule a space reclamation job, how to partition data into multiple tasks to delegate to available task workers 110, and manage status of task workers 110 to determine which task workers 110 are available for specific tasks.

In an embodiment, the job controller 105 may determine to initiate the space reclamation job based upon currently available storage space within the storage pool 130. For example, a configured usage threshold may be used to trigger a space reclamation job when available storage space falls below a configured threshold. In another example, a space prediction threshold may be used, where a space prediction threshold calculates the predicted amount of time remaining before available storage space is used. Then based upon the predicted amount of time left before the storage space is used, a space reclamation job may be triggered or scheduled to run prior to utilizing all of the storage space within the one or more storage pools. In another embodiment, the job controller 105 may determine to initiate a space reclamation job based upon a configured space reclamation schedule. For example, the space reclamation job may be scheduled to run hourly, daily, weekly, or at any other specified time.

In an embodiment, the job controller 105 is configured to keep track of the total number of task workers 110 and the current status of task workers 110. For example, the job controller 105 may ping available task workers 110 in order to determine their current status and to determine the current number of task workers 110 available. For example, if the job controller 105 has partitioned the list of clump fingerprints into 20 partitions, then the job controller 105 may ping the task workers 110 to determine how many task workers 110 may be assigned the task of determining containers for the list of clump fingerprints. If after pinging the task workers 110, the job controller 105 determines that only 10 task workers 110 are available, then the job controller 105 may assign 10 of the 20 partitioned tasks to the task workers 110. In an embodiment, the job controller 105 may also periodically ping a specific task worker that has been assigned a task to ensure that the specific task worker is still alive. If the specific task worker is unresponsive, then the job controller 105 may conclude that the specific task worker is not alive and may reassign that task to the next available task worker 110.

In an embodiment, the job controller 105 is configured to send source, partitioning and destination instructions along with a specific task to the task workers 110. Source instructions refer to instructions that specify the input to be used to execute the specific task. Partitioning instructions refer to instructions that specify how results from a specific task are to be partitioned. For example, if the results for the specific task contain live clump fingerprints, then the partitioning instructions may specify range based clump fingerprint partitioning instructions. Destination instructions refer to instructions that specify a destination for the results from the specific task. For example, if the job controller 105 delegates tasks to determine container identifiers for a set of clump fingerprints and specifies destination instructions that include a destination location within the storage pool 130, then the specific task worker will, after completing the task, send the output from the task to the specified destination location within the storage pool 130. In an embodiment, partition and destination instructions may also specify other task workers 110. For example, the partition and destination instructions may specify that a specific task worker, when finished, is to send the output to another set of task workers 110 designated to begin the next phase in the space reclamation job.

Functional Overview

Techniques are described herein where the operation of reclaiming space is divided into multiple phases. During each phase, the work associated with the phase is broken up into independent tasks. The tasks of each phase are independent in that any task of any given phase may be performed without regard to the progress of any other task in that same phase.

Prior to the first phase, the tasks for the first phase must be established. In one embodiment, establishing the tasks for the first phase involves establishing a candidate set, causing object metadata to be synchronized and made persistent, dividing that object metadata into partitions, and assigning those partitions to tasks. Each of these operations shall be described in greater detail hereafter. In one embodiment, establishing a candidate set is the first phase of the operation of reclaiming space.

Establishing a "Candidate Set"

Because the file system may remain in-use during the storage reclamation operation, live and dead clumps may be continuously created by the file system during the storage reclamation operation. Consequently, determining whether a clump is live or dead is intricate work. According to one embodiment, before the mark-and-sweep operation begins, job controller 105 first puts a limit on the containers that will be involved in the storage reclamation operation. The containers that are selected to be involved in a reclamation operation are referred to herein as the "candidate set" of the reclamation operation.

In an embodiment, job controller 105 only selects, for the candidate set, containers that have been "stabilized". A stabilized container is a container that is no longer being used by any writing process. For example, in one embodiment, each writing process is assigned a distinct "writer id" and only writes to a log associated with that writer id. Thus, the series of containers in any given log are only written to by the one writing process assigned the writer id of the log. To stabilize the containers that belong to any given log, the writing process that is using that log is assigned a new writer id. Because the writing process is assigned a new writer id, the writing process begins writing to a new log. After the new writer id is assigned, no writing process will be writing to the series of containers that were associated with the previous writer id. Consequently, those containers associated with the previous writer id are stabilized.

Figure 3:
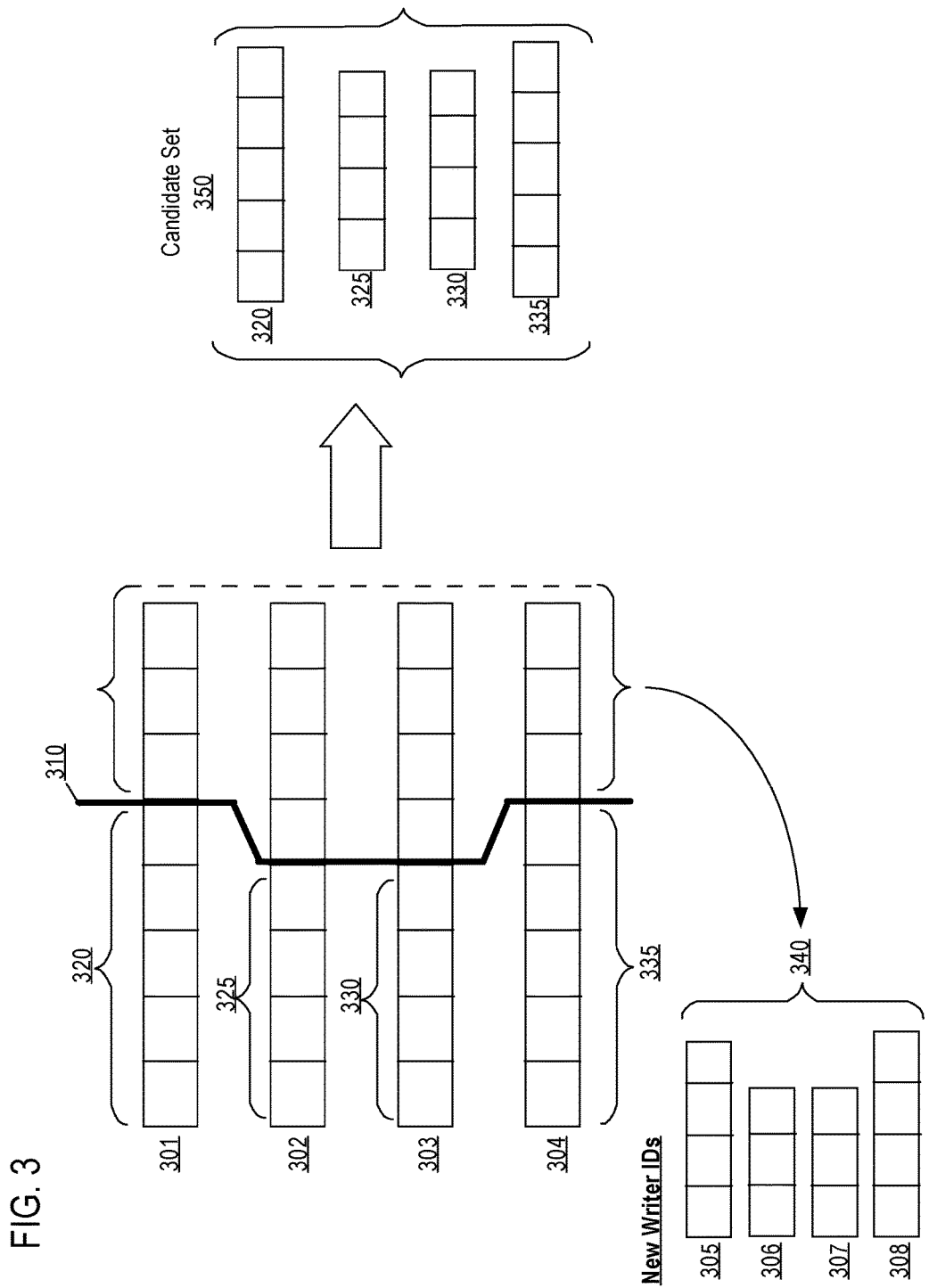
FIG. 3 depicts an example of generating a candidate set of containers from a set of data logs within the storage pool.

In an embodiment, determining the candidate set of containers includes assigning new writer ids to the writing processes of multiple logs, thereby establishing a candidate set boundary for each of those logs. The candidate set boundary is used to delineate between containers that are part of the candidate set of containers and containers that not part of the candidate set of containers. FIG. 3 depicts an example set of data logs within the storage pool and a generated candidate set boundary used to identify which containers are part of the candidate set of containers. Data logs 301-304 each represent a unique data log. Each of the data logs 301-304 contain containers of data, which are depicted as squares within the data logs. Each of the writing processes corresponding to the data logs 301-304 are assigned new writer ids and begin writing to data logs 305-308. Candidate set boundary 310 is a virtual boundary line used to delineate between containers that are stabilized and containers that are still receiving write and/or update requests. The position of the candidate set boundary 310 may vary between each of the data logs 301-304 depending on how many containers within data logs 301-304 are written before new writer ids are assigned to the corresponding writing processes.

In an embodiment, the job controller 105 communicates with the file system 115 to assign new writer ids serially to the file system writing processes. The candidate set boundary 310 is generated based on the largest previous writer id among the writing processes, and used to determine which containers make up the candidate set of containers. Referring back to FIG. 3 candidate set 350 represents the candidate set of containers. Candidate set 350 includes container sets 320-335 which are the stabilized containers from the data logs 301-304. Containers within set 340 are the remaining containers that are still receiving active updates.

In alternative embodiments, other techniques may be used to stabilize containers. For example, rather than assigning new writer ids to the writing processes (thereby causing new logs to be started), the job controller 105 may ensure stabilization of containers by requesting the file system 115 to suspend write and/or update requests for data within certain containers. The job controller 105 may also ensure stabilization of containers by asking the file system 115 to determine which containers within each of the data logs 301-304 have been stabilized. Thus, the techniques described herein are not limited to any particular approach for stabilizing containers.

Flushing Metadata

After the candidate set has been established, job controller 105 ensures that, for all objects that contain clumps in the candidate set, the file system finishes generating metadata for the objects, and flushes the metadata to persistent storage. Causing the file system to generate all necessary object metadata for those objects, and to flush that metadata to persistent storage, ensures that there will be no object that (a) has a live clump in the candidate set, but (b) is not identified in the persistent file system metadata.

Identifying Live Objects

Figure 2:
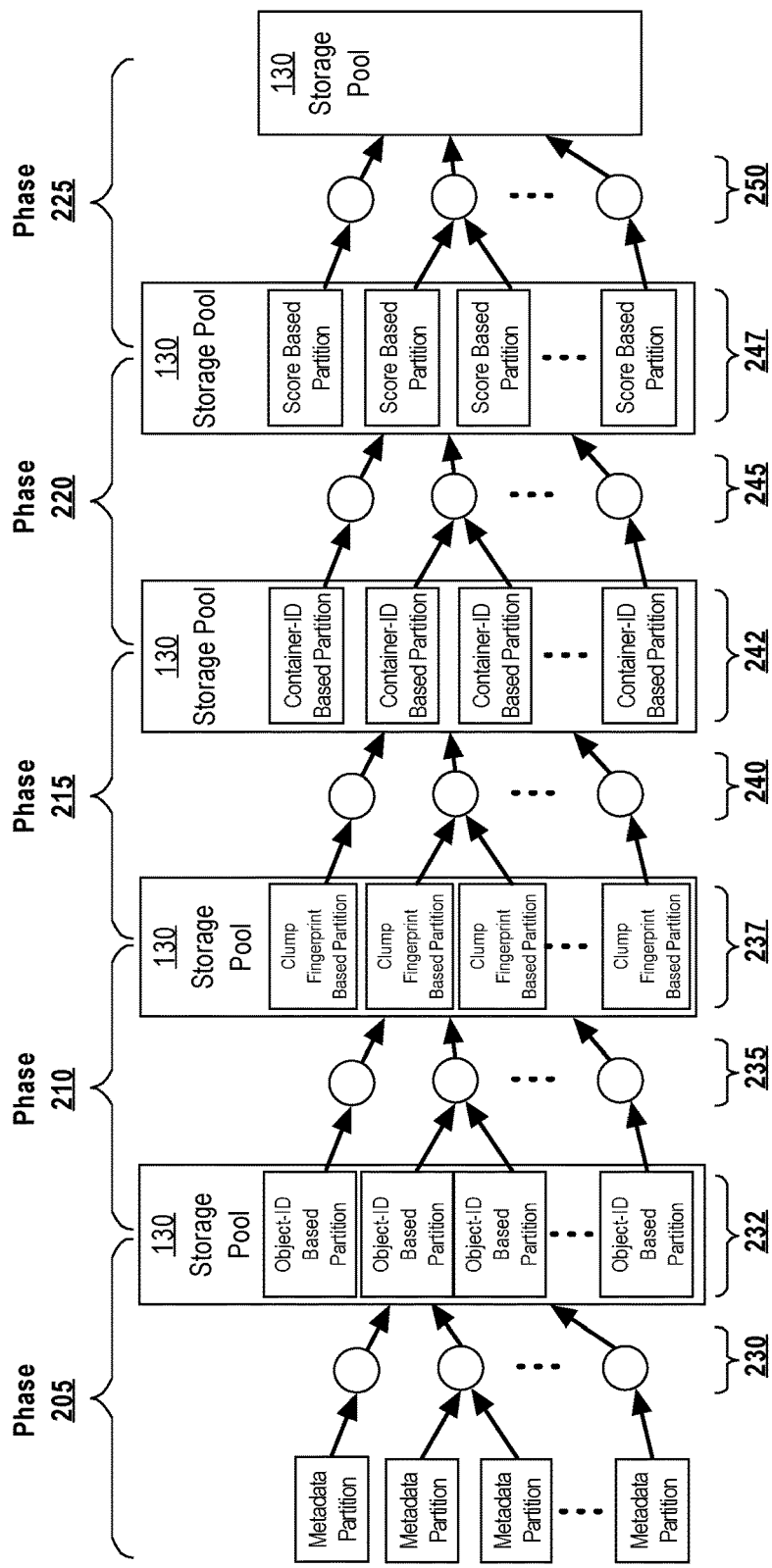
FIG. 2 depicts an embodiment of the interaction between a job controller and task workers during multiple phases of a space reclamation job.

As explained above, using the techniques described herein, the work involved in mark-and-sweep and copy forward space reclamation is performed in numerous phases. After the necessary file system metadata has been flushed to disk, the first of the phases may begin. FIG. 2 depicts the multiple phases of a space reclamation job. According to the illustrated embodiment, the first phase 205 involves identifying live objects.

Specifically, phase 205 involves identifying live objects that contain clumps within the candidate set of containers. Those objects are identified from the metadata that was flushed to disk by the file system. Specifically, in an embodiment, the job controller 105 partitions the file system metadata, and assigns a partition of metadata to each of live-object-identifying workers 230. Thus, each task assigned to live-object-identifying workers 230 involves identifying the live objects that are reflected in a specific portion of the file system's metadata.

The number of partitions into which the metadata is divided may be greater than the number of live-object-identifying workers 230. When such is the case, job controller 105 may initially assign each task worker a task associated with one partition. When each task worker finishes processing that initially-assigned partition, the job controller 105 may assign the task worker a task associated with another partition. This process may continue until every partition of the relevant metadata has been processed by one of the live-object-identifying workers.

Each task delegated by the job controller 105 to the live-object-identifying workers 230 is an independently executable task that does not require input or communication from other tasks being performed by other live-object-identifying workers 230. Each of the live-object-identifying workers 230 may communicate with the file system 115, namespace 120, and the storage pool 130 to determine lists of live objects. In an embodiment, each task worker within the set of live-object-identifying workers 230 may scan its designated metadata partition and generate a list of live objects identified therein. The list of live objects generated by each object-identifying worker 230 is then stored to storage pool 130. The benefit of storing results within the storage pool 130 is that the results are available to any of the task workers 110 to work on in a subsequent phase. It promotes parallelization of tasks within phases such that no performance bottlenecks occur at either task workers 110 or the job controller 105. Additionally, this parallelization allows for scalability of additional storage nodes where each new storage node implements one or more new task workers 110.

According to one embodiment, the data identifying live objects are stored into object-id based partitions 232, where the partition into which data identifying each live object is stored is based on the object-id of the live object. For example, a hash function may be applied to the object-id of a live object to determine which of the partitions is to store the information that identifies the live object. The result of the object-id-based redistribution of data is a set of object-id based partitions 232. Because partitions 232 are formed based on object-ids, any given object-id will appear in only one of partitions 232.

According to one embodiment, live-object-identifying workers 230 write their results to the appropriate partitions 232. According to another embodiment, live-object-identifying workers 230 simply provide their output to job controller 105, and job controller 105 compiles the multiple lists of live objects into a single list of live objects that represents all live objects within the candidate set 350, and then partitions that list to form partitions 232.

Identifying Live Clumps

Referring back to FIG. 2, at phase 210 the job controller 105 assigns tasks to live-clump-identifying workers 235. During phase 210, each task corresponds to one of partitions 232. The task worker assigned a partition (a) reads the list of live objects for its assigned partition, and (b) identifies the live clumps to which those live objects are mapped.

In an embodiment, each task worker of the live-clump-identifying workers 235 receives a subset of live object IDs (from its assigned partition) and enumerates through the object-to-clump mapping in the file manager 122 to produce a list of live-clump-references that make up the live objects within the subset of live object IDs. In an embodiment, the list of live-clump-references is a list of clump fingerprints.

Figure 4:
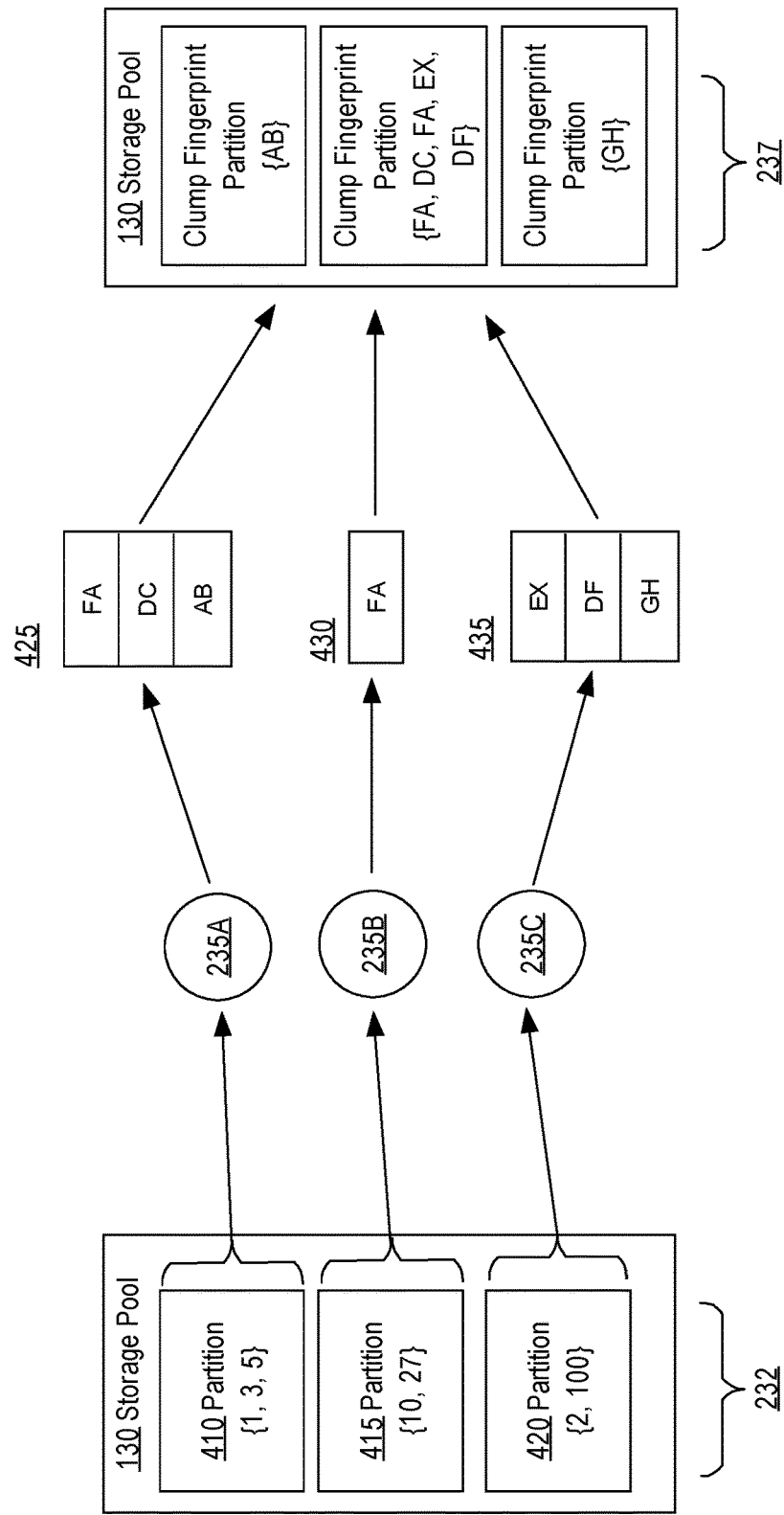
FIG. 4 depicts an example embodiment of task workers identifying clump fingerprints from subsets of live objects.

FIG. 4 represents an example embodiment of the live-clump-identifying workers 235, receiving object-id-based partitions, which contain subsets of live object IDs, in order to identify the clump fingerprints for each live object. The set of object-id-based partitions that make up the partitions 232 are managed by the job controller 105. In an embodiment, the job controller 105 assigns the object-id-based partitions 410, 415, and 420 to available live-clump-identifying workers 235. Each of the live-clump-identifying workers 235 then enumerates through the object-to-clump mapping metadata to determine the clump fingerprints associated with each of the live objects within their assigned object-id-based partition. For example, for object-id-based partition 410, the corresponding live-clump-identifying worker 235A enumerates through the object-to-clump mapping metadata to determine all clumps associated with object IDs {1, 3, 5}. The output is clump fingerprint list 425, which includes clump fingerprints {FA, CD, AB}.

Similarly, live-clump-identifying worker 235B receives object-id-based partition 415 and then enumerates through the object-to-clump mapping metadata to determine all clumps associated with object IDs {10, 27}. Clump fingerprint list 430 represents the output of the live-clump-identifying worker 235B which includes {FA}. Lastly, live-clump-identifying worker 235C receives object-id-based partition 420 and then enumerates through the object-to-clump mapping metadata to determine all clumps associated with object IDs {2, 100}. Clump fingerprint list 435 represents the output from the live-clump-identifying worker 235C and includes {EX, DF, GH}.

In an embodiment, the live-clump-identifying workers 235A, 235B, and 235C, use range partitioning, based on the clump fingerprints, to write results from the corresponding clump fingerprint lists 425, 430, and 435 to appropriate clump-fingerprint based partitions 237 stored in the storage pool 130. In an embodiment that uses range-based partitioning, clump-fingerprint based partitions 237 are formed based on clump fingerprints such that each partition within partitions 237 contains a near equal range of clump fingerprints. In one embodiment, the range of clump fingerprints is determined based on the number of unique clump fingerprints that are expected to fall within the range of clump fingerprints and the number of clump fingerprints that can fit in the memory of each of the task workers.

In an alternative embodiment, the live-clump-identifying workers 235A, 235B, and 235C send the clump fingerprint lists 425, 430, and 435 to the job controller 105. The job controller 105 compiles a list of clump fingerprints and then performs range-based partitioning, using clump fingerprints as the partitioning key, to generate partitions 237.

In an embodiment, lists of clump fingerprints within partitions 237 may also include attribute data associated with each clump fingerprint. For example, a lifetime attribute may be included with each clump fingerprint, where the lifetime attribute is an expected expiration date for clumps in persistent storage. In other embodiment, other attributes describing properties of the clump fingerprints may be stored within partitions 237.

In an alternative embodiment, to determine the list of clump fingerprints from object-id-based partitions, a list of live clump fingerprints may be determined based on a clump reference count from the file system 115. The file system 115 may maintain a reference count of the number of times a clump is referenced within the metadata. For example, if file A, file B, and file C each reference clump Z, then the reference count value for clump Z is three. As each of the files A, B, and C are deleted, the reference count for clump Z is decremented. After all three files are deleted, the reference count for clump Z would be zero. In such an embodiment, live clumps are clumps that have a positive reference count. The job controller 105 may assign partitions of the clump reference count metadata to the live-clump-identifying workers 235 in order to determine the live clump fingerprints based upon reference count.

Determining Containers for Live Clumps

Referring back to FIG. 2, phase 215 represents a phase for determining container identifiers for each of the clump fingerprints within partitions 237.

In an embodiment, at phase 215 the job controller 105 assigns partitions from the partitions 237 to container-identifying workers 240. In order to ensure that equally sized tasks are assigned, the job controller 105 may consolidate and repartition the partitions within partitions 237 in order to ensure that the partitions are of near equal size. The repartitioning step may involve selecting the ranges used for the range-based partitioning such that each partition contains a contiguous range of clump fingerprints that is similarly sized. The task of identifying containers for each clump fingerprint is delegated to container-identifying workers 240.

Figure 5:
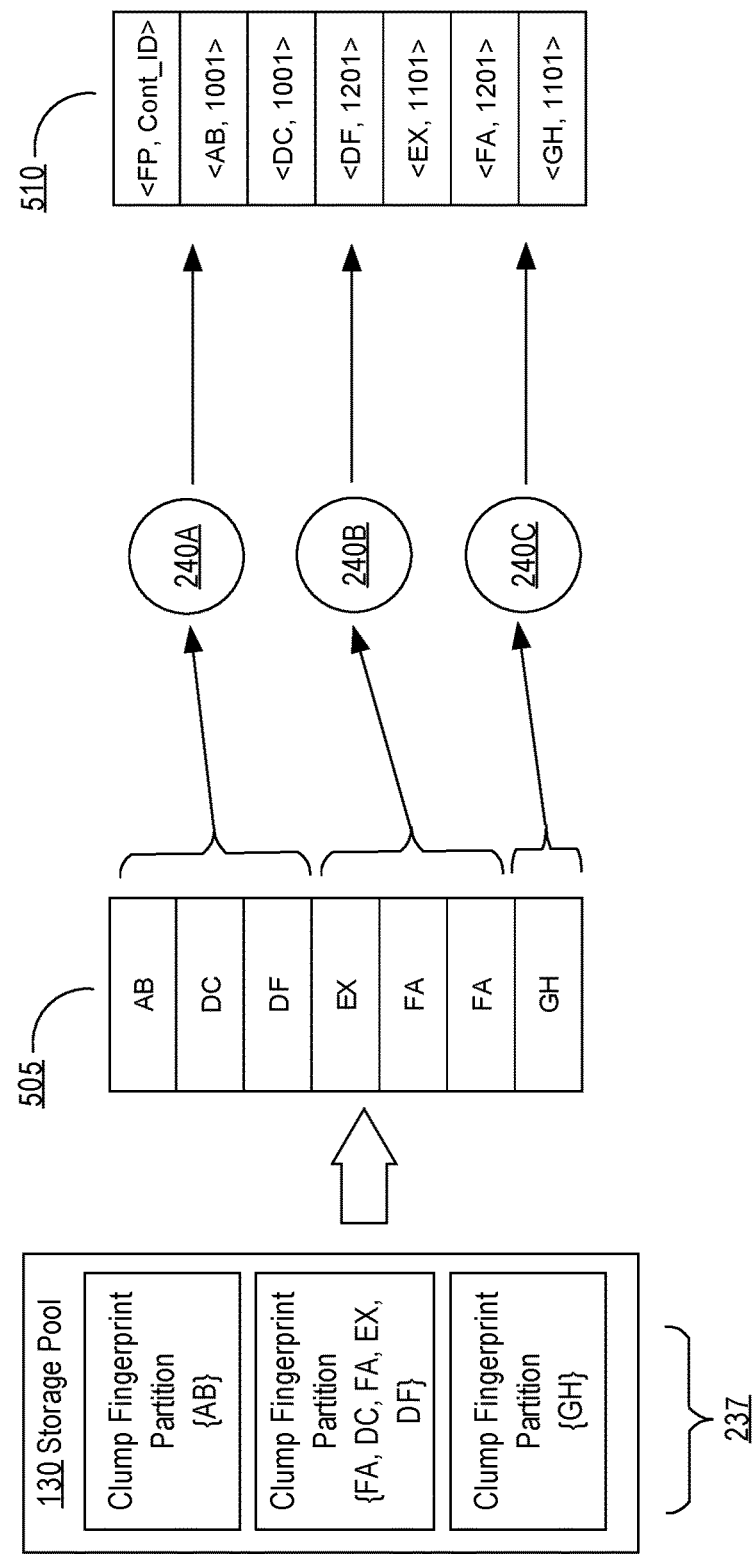
FIG. 5 depicts an example embodiment of the job controller delegating partitions of clump fingerprints to task workers, which then determine container identifiers for the clump fingerprints.

FIG. 5 depicts an example embodiment of the container-identifying workers 240, receiving clump fingerprint partitions, which contain subsets of live clump fingerprints, in order to identify the container-id for each live clump fingerprint. The set of clump fingerprint partitions that make up the partitions 237 are managed by the job controller 105. In an embodiment, the job controller 105 assigns the clump fingerprint partitions 510, 515, and 520 to available container-identifying workers 240.

Each of the container-identifying workers 240 then reorganizes the clump fingerprint partitions 237 into sorted lists of clump fingerprints. In the illustrated example, there are three partitions 237 that respectively include clump fingerprint lists {AB, CD}, {FA, FA, EX, DF}, and {GH}. The container-identifying workers 240 sorts each of the lists to produce the sorted list of clump fingerprints {AB, CD} 525, {DF, EX, FA, FA} 530 and {GH} 535. In the current example, the clump fingerprints are represented as alphabetic codes and are sorted accordingly. In other embodiments, sorting the clump fingerprints may be based on other types of codes, such as hexadecimal, alphanumeric, or binary, and may be sorted based on the code type.

In an embodiment, the container-identifying workers 240 remove any duplicate clump fingerprints from their received clump fingerprint partition. For example, container-identifying worker 240B received the clump fingerprint partition that includes {DF, EX, FA, FA}. Since there are two copies of the FA clump fingerprint within the clump fingerprint partition, the container-identifying worker 240B may remove one copy of FA, resulting in a clump fingerprint partition of {DF, EX, FA}.

Fingerprint Index

The fingerprint index 125 contains the clump-reference-to-container-identifier mapping that maps the clump fingerprints to their corresponding container IDs where each respective clump is stored. There may be multiple container IDs corresponding to a specific clump fingerprint because multiple containers may have stored the clump. The container-identifying workers 240 determine the container identifiers for each clump fingerprint by querying the fingerprint index 125.

Because each partition is for a specific range of fingerprints, the task worker assigned the partition associated with a fingerprint range needs to access only the relatively small portion of the fingerprint index 125 that corresponds to that fingerprint range. In an embodiment, each of the container-identifying workers 240 may perform a join operation between the clump fingerprints in the assigned clump fingerprint partition and the fingerprint index 125.

Join Operation

In one embodiment, the join operation executed is a right outer join of the clump fingerprint partition to the fingerprint index 125. For example, the clump fingerprint partition contains the live clump fingerprint columns <fingerprint, attributes> for the particular partition where attributes may represent one or more attributes associated with the clump fingerprint. The fingerprint index 125 contains columns <fingerprint, container ID>. Therefore, the right outer join would produce tuples such as <fingerprint, attributes, container ID>. Since the join operation is a right outer join, when fingerprints from the fingerprint index 125 do not match the fingerprints in the clump fingerprint partition, null values are populated in the result set for the fingerprint and attributes entries. These null values in the result set indicate that the specific fingerprint in the fingerprint index 125 is not a live clump fingerprint. In an embodiment, the clump fingerprint partition and/or the fingerprint index 125 is not limited to the above described entries and may contain other entries as part of the join operation.

In an alternative embodiment, each of the container-identifying workers 240 performs an inner join operation between the clump fingerprints in the clump fingerprint partition and the fingerprint index 125. Using the previous example, the inner join operation may involve joining the <fingerprint, attributes> entries from the clump fingerprint partition to the <fingerprint, container ID> entries in the fingerprint index 125. The result set of the inner join would then include a matching set of entries, <fingerprint, attributes, container ID>, that only include live clump fingerprints for the clump fingerprint partition.

In one embodiment, the fingerprint index 125 may contain multiple clump-reference-to-container-identifier mappings for a specific clump fingerprint because multiple containers may have stored the corresponding clump. When a container-identifying worker encounters multiple mappings for a given clump fingerprint in performing the join operation between the clump fingerprints in the clump fingerprint partition and the fingerprint index 125, the worker selects one of the multiple mappings to include in the result of the join operation. In one embodiment, the container-identifying worker selects the one clump-reference-to-container-identifier mapping for the given clump fingerprint that corresponds to the container that was most recently written.

Join by Binary Search

In one embodiment of the join operation, the join operation is implemented as using a binary search approach where each of the container-identifying workers 240 perform a binary search on the fingerprint index 125. In a binary search, the specific clump fingerprint from the clump fingerprint partition is compared to the fingerprints, referred to here as keys, in the fingerprint index 125 by first comparing the specific clump fingerprint to the key in the middle of the fingerprint index 125. If the specific clump fingerprint does not match the key then the container-identifying worker 240A divides the fingerprint index 125 at the point of the compared key and then chooses the half of the fingerprint index 125 based upon the comparison of the key and the specific clump fingerprint.

For example, if the fingerprint index 125 contained key values ranging from 1-20 and the specific clump fingerprint is 8, then when compared to the middle key value, which is 11, the container-identifying worker 240A would divide the range of keys at 11 into key ranges 1-10 and 12-20, then choose the key range 1-10 for the next binary comparison because the specific clump fingerprint is within the first key range 1-10. After choosing the next key range, the container-identifying workers 240 repeat the binary search process against the new key range 1-10 until the desired key that matches the specific clump fingerprint is found.

In one embodiment, each of the container-identifying workers 240 loads into memory the portion of the fingerprint index corresponding to the fingerprint range of the partition of clump fingerprints that the worker is processing, sorts the in-memory portion of the fingerprint index, and performs the join operation using binary search against the in-memory sorted portion of the fingerprint index.

Join by Interpolated Search

In another embodiment of the join operation performed by the container-identifying worker 240A, the join operation is implemented using an interpolated search algorithm. An interpolated search algorithm searches for a given key value against an array that has been ordered by key values. By knowing the starting and ending key values of the array and presuming that the key values in the array are uniformly distributed, the container-identifying worker 240A may compare the specific clump fingerprint to a key at a specific location in the array based upon the range of key values in the array and the uniform distribution of the key values in the array. If the key value at the specific location in the array does not match the specific clump fingerprint, then the container-identifying worker 240A may divide the array into two partitions to the left and right of the specific location and repeat the interpolation search process on the partition that has a range that contains the specific clump fingerprint value.

For example, if the range of the fingerprint index 125 is 1-20 and the specific clump fingerprint is 4, then the container-identifying worker 240A may compare the specific clump fingerprint to a key located ⅕ into the fingerprint index 125. Suppose the key located ⅕ into the fingerprint index 125 is 5, then the container-identifying worker 240A may divide the index array into two partitions 1-4 and 6-20 and choose the partition which has a range that contains the specific clump fingerprint value. In this case, the 1-4 partition contains the clump fingerprint value. The container-identifying worker 240A would then repeat the interpolated search on the 1-4 partition. In an embodiment the interpolated search steps may be repeated until a key value matching the specific clump fingerprint is matched. Once the specific clump fingerprint is matched the container-identifying worker 240A repeats the steps for each clump fingerprint within the clump fingerprint partition.

The benefit to performing an interpolated search when joining the clump fingerprint partitions and the fingerprint index 125 is that it reduces the number of search rounds to match key values to determine the container ID for specific clump fingerprints. Reducing the number of search rounds reduces the number of computing cycles needed for each of the container-identifying workers 240 and reduces the time required to perform the container identification step.

In one embodiment, each of the container-identifying workers 240 loads into memory the portion of the fingerprint index corresponding to the fingerprint range of the partition of clump fingerprints that the worker is processing, sorts the in-memory portion of the fingerprint index, and performs the join operation using interpolation search against the in-memory sorted portion of the fingerprint index.

Writing Clump Fingerprint-to-Container ID Results

Referring back to FIG. 5, the container-identifying worker 240A performs a join operation against the fingerprint index 125 to determine that clump fingerprints AB and CD are stored within container ID 1001. In one embodiment, the container-identifying workers 240 write their results to respective container-id partitions 242 stored within the storage pool 130. The results may be referred to as live-clump fingerprint-to-container-id lists as they contain mapping between the live clump fingerprints and their container-id storage location. In one embodiment, the container-identifying workers 240 write each live-clump-fingerprint-to-container-id mapping to a container-id partition selected based on a hash of the container-id such that all the live clump fingerprints that are mapped to a given container-id are written to the same container-id partition. In the embodiment illustrated in FIG. 5, the first partition of container-id partitions 242 contains all live-clump-fingerprint-to-container-id tuples related to container 1001, the second partition contains all tuples related to container 1201, and the third partition contains all tuples related to containers 1101 and 1102.

In another embodiment, the container-identifying workers 240 send their results to the job controller 105, which compiles the live-clump-fingerprint-to-container-id lists into container-id partitions 242. FIG. 5 depicts an example set of container-id partitions 242 that has been compiled from the results of the container-identifying workers 240. The fingerprint-to-container-id set 242 contains a list where each element contains a fingerprint and a container ID. In an embodiment, the fingerprint-to-container id set 242 may also include other fields that represent other attributes for the clumps.

Scoring Containers of Live Clumps

Referring back to FIG. 2, phase 220 represents a phase for assigning a score to each container-id in the container-id partitions 242 based upon the priority with which to reclaim space from the corresponding container.

Figure 6:
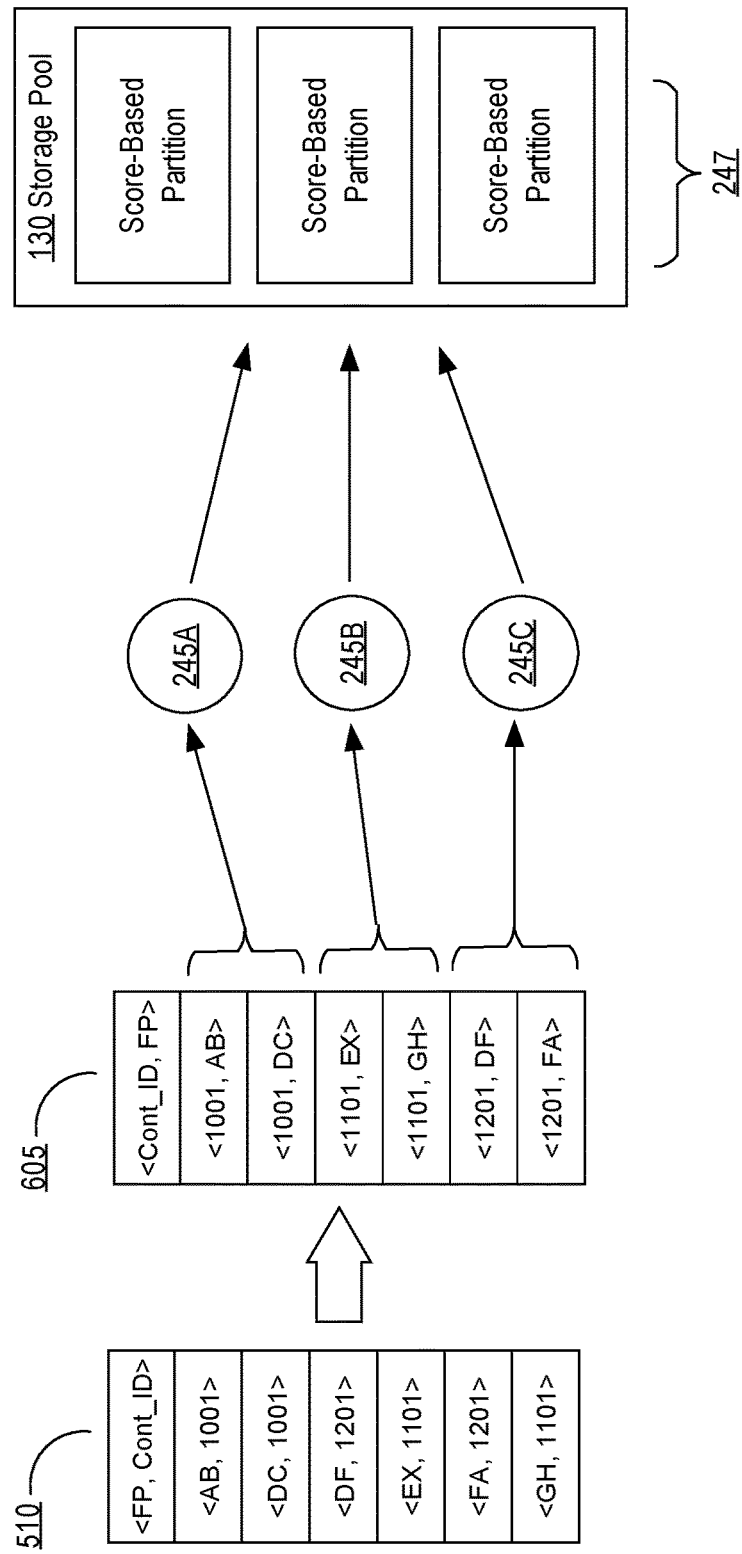
FIG. 6 depicts an example embodiment of the job controller delegating sets of clump fingerprints based on container identifiers to task workers, which then calculate space reclamation scores for the containers.

In an embodiment, at phase 220 the job controller 105 assigns partitions from the partitions 242 to container-scoring task workers 245. The container-identifying workers 240 then score the container-ids based upon the number of live clumps and the attributes of each live clump within the containers. As depicted in FIG. 6, the job controller assigns the partition that has tuples for container-id 1001 to container-scoring task worker 245A, the partition that has tuples for container-id 1201 to container-scoring task worker 245B, and the partition that has tuples for container-id 1101 and 1102 to container-scoring task worker 245C.

In an embodiment, each of the container-scoring task workers 245 loads into memory the live-clump-fingerprint-to-container-id tuples of the container-id partition that it has been assigned, and sorts the in-memory list of tuples by container-id to determine the live clumps in each respective container. The worker then assigns a score to each container-id, calculating the score based upon attributes of the live clumps within the containers such as, the lifetime of each live clump, the number of live clumps in the particular container, and the size of the live clumps in the particular container. Lifetime refers to how much longer the live clump is expected to remain live. The value of the score for a particular container-id represents how much space will be reclaimed relative to the amount of work required to reclaim the space during the copy forward phase.

For example, containers that contain no live clumps are assigned the highest score because the entire space of the container may be reclaimed without having to use resources to copy forward live clumps to a new container. Conversely, containers that contain many live clumps may receive a relatively low score because resources are required to copy the live clumps and in turn the amount of space reclaimed is minimal since the live clumps that are copied forward occupy new space in the new container. In one embodiment, containers that contain many live clumps that will soon become dead are assigned a relatively low score because it is more efficient to wait for the clumps to become dead before reclaiming space from those containers.

For this reason, the lifetime of each live clump, the number of live clumps, and the size of each live clump affect the score assigned to each container ID. In an embodiment, the score may be configured to apply different weights to each of the lifetime, number, and size characteristics associated with the live clumps.

Referring back to FIG. 6, after the container-scoring task workers 245A, 245B, and 245C assign scores to the container-ids in their assigned partitions, the container-scoring task workers 245A, 245B, and 245C write their results to score-based partitions 247 within the storage pool 130. Specifically, each of score-based partitions 247 corresponds to a range of scores, and range-based partitioning is used by the container-scoring task workers 245 to write each container-id to the partition that is associated with the range into which the container's score falls. For example, if the scoring system is based on values between 0-100, then the division may be: partition 1 covers the scores 91-100, partition 2 covers scores 76-90, partition 3 covers scores 56-75, partition 4 covers scores 31-55, and partition 5 covers scores 0-30.

In one embodiment, there may be multiple partitions covering the same score range and container-scoring task workers 245 select a partition for each container-id based first on the score assigned to the container-id and then a hash of the container-id to select among the multiple partitions covering the same score range. In one embodiment, container-ids with scores that are below a threshold are omitted from the results and are not included in the score-based partitions 247.

In an alternative embodiment, the container-scoring task workers 245A, 245B, and 245C send their results to the job controller 105. The job controller 105 then divides the container-ids into partitions, using range-based partitioning, based on the scores determined for the corresponding containers.

Copy Forward Live Objects

Copy-forward operations are performed on selected containers within the candidate set 350 to copy forward all live clumps in the selected containers into new containers. The selected containers are then deleted to free up space occupied by the selected containers. Referring back to FIG. 2, at phase 225 the job controller 105 assigns containers, within the score-based partitions 247, to one or more copy-forward task workers 250.

Figure 7:
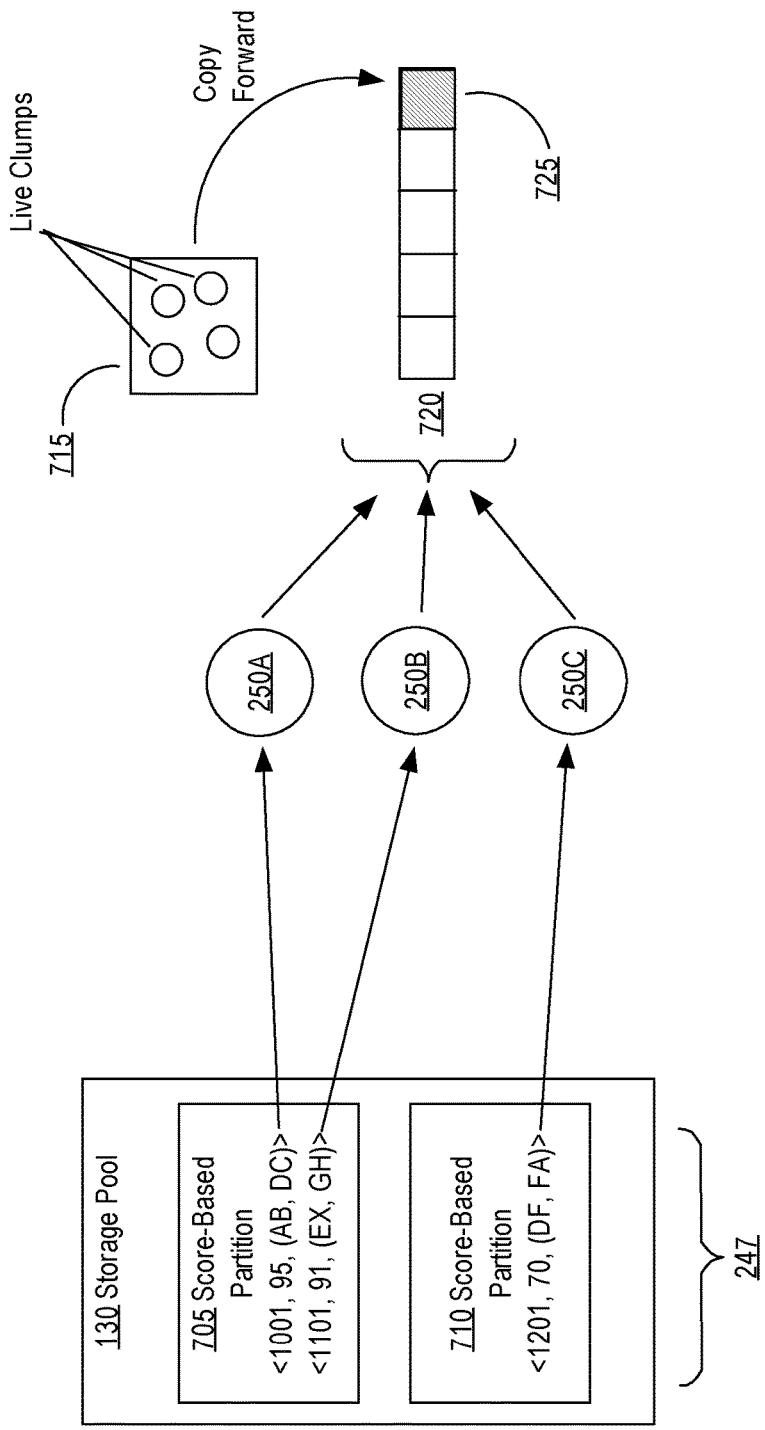
FIG. 7 depicts an example embodiment of the job controller delegating copy-forward operations to task workers.

FIG. 7 represents an example embodiment of assigning the copy-forward operations to one or more copy-forward task workers 250. In FIG. 7, the job controller 105 assigns container-ids from score-based partitions to specific copy-forward task workers.

The score-based partitions are assigned to copy-forward task workers 250 in order of the score range of the partitions so that container-ids associated with highest scores are assigned to workers 250 first. Performing copy-forward operations on container-ids within the highest score-based partition will yield the most amount of space reclamation relative to resources required to reclaim the space. In one embodiment, there may be multiple score-based partitions covering the same score range, and each of the partitions that cover a given score range are assigned to workers 250 before any of the partitions that cover a lower score range.

Returning to the embodiment illustrated in FIG. 7, container-ids 1001 and 1101 have assigned scores of 95 and 91 respectively. Based on the score and the score-based partition definitions for score ranges, container-ids 1001 and 1101 are stored within score-based partition 705. Container-id 1201 has a score of 70 and is stored within score-based partition 710 which covers the score range of 56-75. In this example, container-id 1102 has a score of 10 and is omitted from the score-based partitions because reclaiming space from the container will not yield much space relative to resources required to reclaim the space. In FIG. 7, the job controller 105 assigns container-ids from score-based partition 705 to copy-forward task worker 250A, and then assigns container-ids from score-based partition 710 to copy forward task worker 250B.

In an embodiment, copy-forward task workers 250 read the live clumps in each assigned container and write the live clumps into a new container. The new container may be located within a new data log. After all of the live clumps within the assigned container have been written to the new container, the assigned container is deleted in order to reclaim the entire space of the assigned container. For example, in FIG. 7, container 715 represents container-id 1001 that has been assigned to copy-forward task worker 250A. Copy-forward task worker 250A then writes new copies of the live clumps from container 715 to the new container 725, which resides within data log 720. This process continues until all live clumps from container 715 have been created in new container 725. After the live clumps are created in new container 725, the copy-forward task worker 250A deletes container 715, thus reclaiming the space occupied by container 715.

In one embodiment, each of the copy-forward task workers 710 loads into memory the score-based partition assigned to the worker, sorts the in-memory score-based partition by the score associated with each container-id, and then copies forward the live clumps in the containers in order of the sorted in-memory score-based partition.

Distributed Virtual Array

Figure 8:
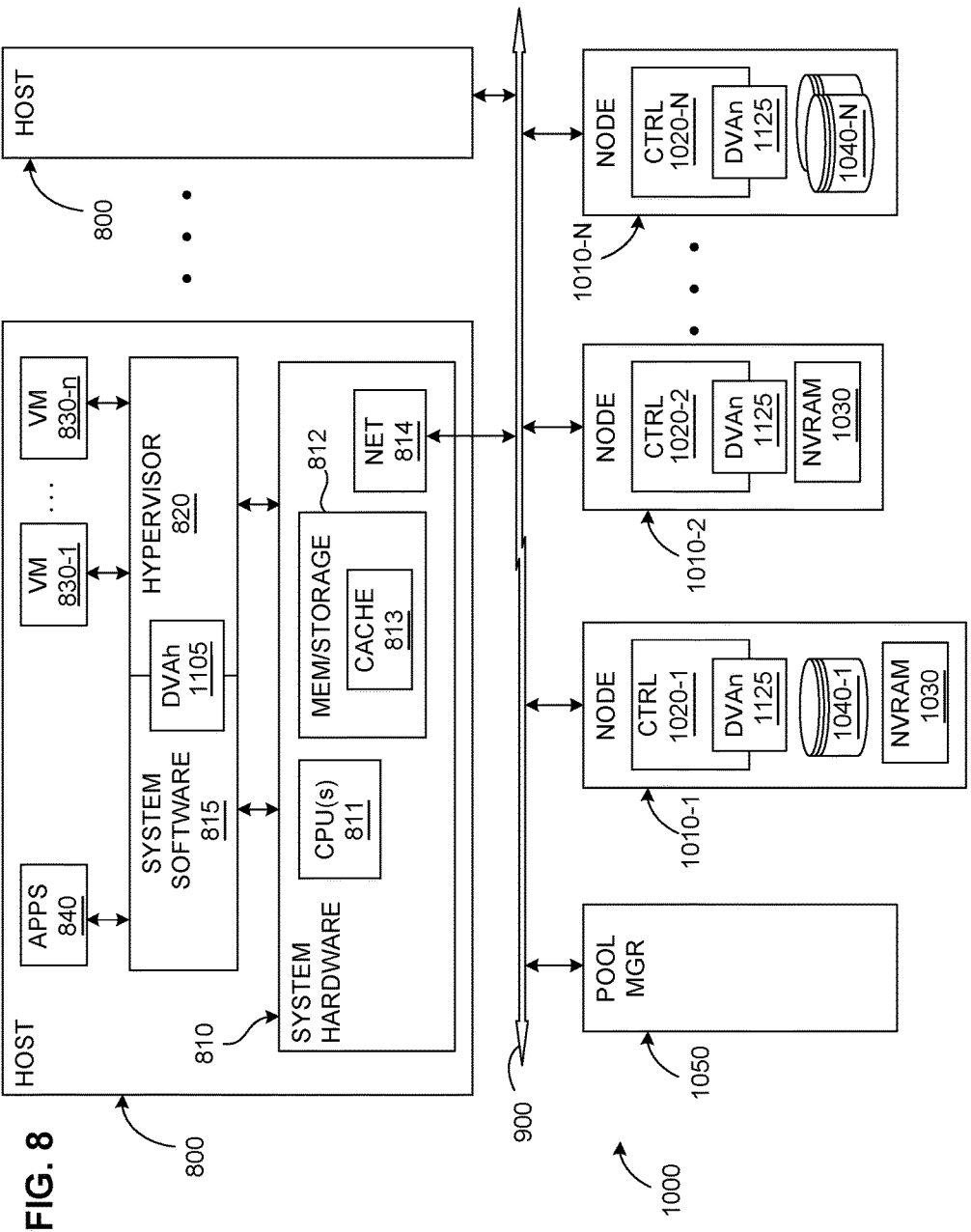
FIG. 8 depicts an embodiment of a Distributed Virtual Array (DVA) system.

FIG. 8 depicts an embodiment of a Distributed Virtual Array (DVA) system that performs space reclamation based on the aforementioned methods. The DVA includes any number (including one) of hosts 800, for example, servers, and a storage Pool 1000, which includes storage nodes 1010-1, 1010-2, . . . , 1010-N (collectively, "1010"), which from the perspective of the hosts, may form a single yet distributed storage system. Entities within the hosts 800 write data that is first stored in non-volatile memory (shown as NVRAM 1030) and ultimately stored in persistent storage devices 1040-1, . . . , 1040-N (collectively, "1040") located in the nodes.

The reading and writing entities may be of any type, including virtual machines 830 (shown separately as "VM"s 830-1 . . . 830-n) or more general, non-virtualized processes such as user-level applications 840. Software and hardware entities that need to read and/or write data are referred to here as "clients".

Each host includes system hardware 810, including one or more processors (CPUs) 811, and some device(s) 812 for non-persistent, volatile and/or persistent, non-volatile, non-transitory storage of data and/or code that may execute on the CPU(s). Traditionally, there is a relatively clear technical distinction between "memory" and "storage", since the former has typically comprised fast, volatile, solid-state devices, whereas the latter have generally comprised slower, non-volatile, mechanical or opto-mechanical devices. With the wide-spread use of modern technologies for bulk, persistent storage, however, this distinction is becoming increasingly less clear. For example, many modern servers use various solid-state storage devices (SSDs) such as "server flash" to increase throughput and speed, which is commonly measured in terms of IOPS (Input/Output Operations Per Second), especially for non-contiguous storage locations. Emerging technologies such as phase-change memory (PRAM) are further blurring the distinction. No specific type of host-side storage or memory technology is required to implement the embodiments described here, and it is not necessary for every host to employ the same storage technology.

The hardware 810 will include other conventional mechanisms such as a network connection device 814 for transfer of data between the various components of the system over one or more network(s) 900, which may be any known public or proprietary local or wide-area network such as the Internet, an internal enterprise network, etc. The only requirement is that, whatever network(s) is/are used, all clients are able to access the storage nodes (see below) they need to access. "The" network 900 is therefore to be read as the collection of whichever networks are implemented, along with any necessary switching or other communications devices if data needs to pass between different networks.

Each host will also include conventional system software 815 such as, depending on the implementation, an operating system (OS), device drivers, etc. In the illustrated configuration, one of the hosts 800 is shown as supporting a virtualization platform, which will typically include some form of hypervisor 820 or similar interface layer between the system hardware 810 and (in the illustrated embodiment) at least one virtual machine (VM) 830-1, . . . , 830-n. As is well known, VM is a software abstraction of an actual physical computer system.

The VMs are shown in FIG. 8 within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc., run directly on "bare metal", that is, directly on the system hardware 810, with no need for interaction with a host OS. In other virtualization platforms, the hypervisor may run on or at the same level as the host OS, which supports and performs some operations upon calls from the hypervisor. The various embodiments described here are not dependent on any particular virtualization architecture, whether for the VMs, the hypervisor(s) or other virtualization layers. Indeed, VMs are not presupposed at all; rather, all that is assumed is some system software layer that processes data storage read/write requests from software and hardware entities ("clients"). A "host" is thus any platform on which processes (of which VMs are a special case) run that may wish to write data to and/or read data from the distributed storage arrangement described below.

Although the various storage nodes 1010 in the pool 1000 are shown as distinct units and may be different physical servers, they may be considered to lie within a single logical boundary for purposes of addressing. The logical, conceptual boundary of the addressable storage pool may, however, also include storage components and processes that extend beyond the illustrated set of physical storage nodes 1010-1, 1010-2, . . . , 1010-N.

Depending on the desired DVA features, a Pool Manager 1050 may also be included to handle some distribution and control functions for the nodes 1010, to maintain administrative and other data common to the nodes 1010, etc. Such a Pool Manager may run within one or more of the storage nodes, within one or more of the hosts, or in a separate computing system attached to the same network. Although they may also be implemented as independent entities, the Pool Manager may also include other managerial components, such as for managing a file name space for files (such as virtual disks) stored within the pool, for cluster management, and for other node-management functions.

Two of the many currently available examples of possible choices to implement a storage node could be a Xyratex™ chassis with multiple disk controllers, or a single-disk "FAWN" (Fast Array of Wimpy Nodes), which is a low-power server architecture for intensive input/output tasks. More generally, the nodes can be implemented using any form of computer that communicates with at least one disk over any form of bus or network connection. Indeed, a node could itself even be an entity that writes data to the storage pool.

Each node contains one or more storage controllers 1020-1, 1020-2, . . . , 1020-N (collectively, 1020) each of which comprises conventional processing circuitry to control one or more disks, flash or other SSD devices or other devices comprising the persistent storage devices 1040 (which comprises more than one physical device). The controller also contains the circuitry necessary to connect to the network 900. In some embodiments, the controller may be integrated with the storage device in single composite module. As with the host 800, the various software components used within the nodes of the storage pool 1000 will be loaded and/or stored in any conventional method so as to be executable on the processor(s) on each hardware platform within the pool; these media and processor(s) are not illustrated separately in the figures for the sake of simplicity—skilled programmers will of course know these will be present. So far, the system components described are also found in many prior art systems.

In the preferred embodiment, at least one of the controllers 1020 also includes, or is able to access, some non-volatile memory 1030 (NVRAM—FIG. 9) to receive and persistently store newly written data with very low latency. In some systems, the NVRAM may be on a special card in a PCIe slot. In some implementations, the controller may have a battery backup; on power failure, the controller will then have enough time to copy a portion of system memory to a flash drive. In this case, the NVRAM 1030 need not be a separate physical component but may instead a logical portion of the general purpose RAM that will be within the controller for other, standard purposes. In some systems, the NVRAM may just be a low-latency SSD. Not all implementations of embodiments require nodes to have both disks and NVRAM; rather, any given node may be configured to have or at least be able to access only one of these two types of persistent storage devices. Thus, as FIG. 8 illustrates, it is possible to implement the system such that one or more nodes may have both persistent storage device(s) and non-volatile memory (node 1010-1, for example), while one or more other nodes may not include the persistent storage device (node 1010-2, for example), and still other node(s) may not have a non-volatile memory component 1030 at all. As FIG. 8 also illustrates with node 1010-N, it is possible to one or more nodes to have more than one persistent storage device (1040-N). Moreover, in some embodiments, the NVRAM may be in a host.

In the preferred embodiment, the host is able to write data over the network specifically to the NVRAM in a storage node or host, distinct from writing to a persistent storage device, and may also give commands to remove data from said NVRAM. This in contrast to the configuration in traditional storage systems in which the NVRAM is a transparent buffer for data on its way to a persistent storage device.

As mentioned above, two dominant storage philosophies fall near different ends of the trade-off spectrum: In hyper-converged systems, substantially the entire storage and computation burden is concentrated within interdependent hosts, whereas in other systems, most of the computational load is placed on the remote storage units themselves and the hosts do not depend directly on each other. Embodiments employ a different approach, in which the usually greater computational resources of hosts are used for many storage-related functions, but used in a way that does not require significant inter-host communication and coordination, and in which the main storage capability remains primarily in the remote nodes where any host can access it without going through another host.

To this end, the hosts and the nodes include respective DVA components—a DVAh 1105 module at the system software level, and DVAn 1125 in the nodes. As FIG. 8 illustrates by overlapping, the DVAh 1105 may be implemented as part of the system software 815, as part of the controlling software (such as the hypervisor 820) of the virtualization platform, or with cooperating components in both. Options include configuring the DVAh component as a driver within the system software 815, or within the hypervisor 820, with call-outs as needed to the host operating system (system software). It would also be possible to configure the DVAh 1105 component within a different user- or system-level process, or even within a "helper" VM. Regardless of the configuration of the DVAh and DVAn, they will generally be implemented as corresponding bodies of processor-executable code that is stored in non-transitory storage and loaded into memory for execution by the host CPU(s) 811.

Similarly, the DVAn 1125 components in the nodes may also be implemented as software running on the respective storage controllers 1020, or as software modules separate from but coordinating with the storage controllers, and will also be implemented as corresponding bodies of processor-executable code that stored in non-transitory storage and loaded into memory for execution by the processor(s) in the nodes 1010.

A cache 813 is preferably included in at least one host, preferably as part of the memory/storage component(s) 812. The cache may be implemented using any conventional, sufficiently fast technology, such as by using one or more Flash memory device(s), phase-change random access memory (PRAM), a portion of the main system memory, etc. The cache may also be implemented as a separately packaged, Solid-State Disk (SSD), a circuit card plugged into a bus within the server, as a module on the server motherboard, etc.

Figure 9:
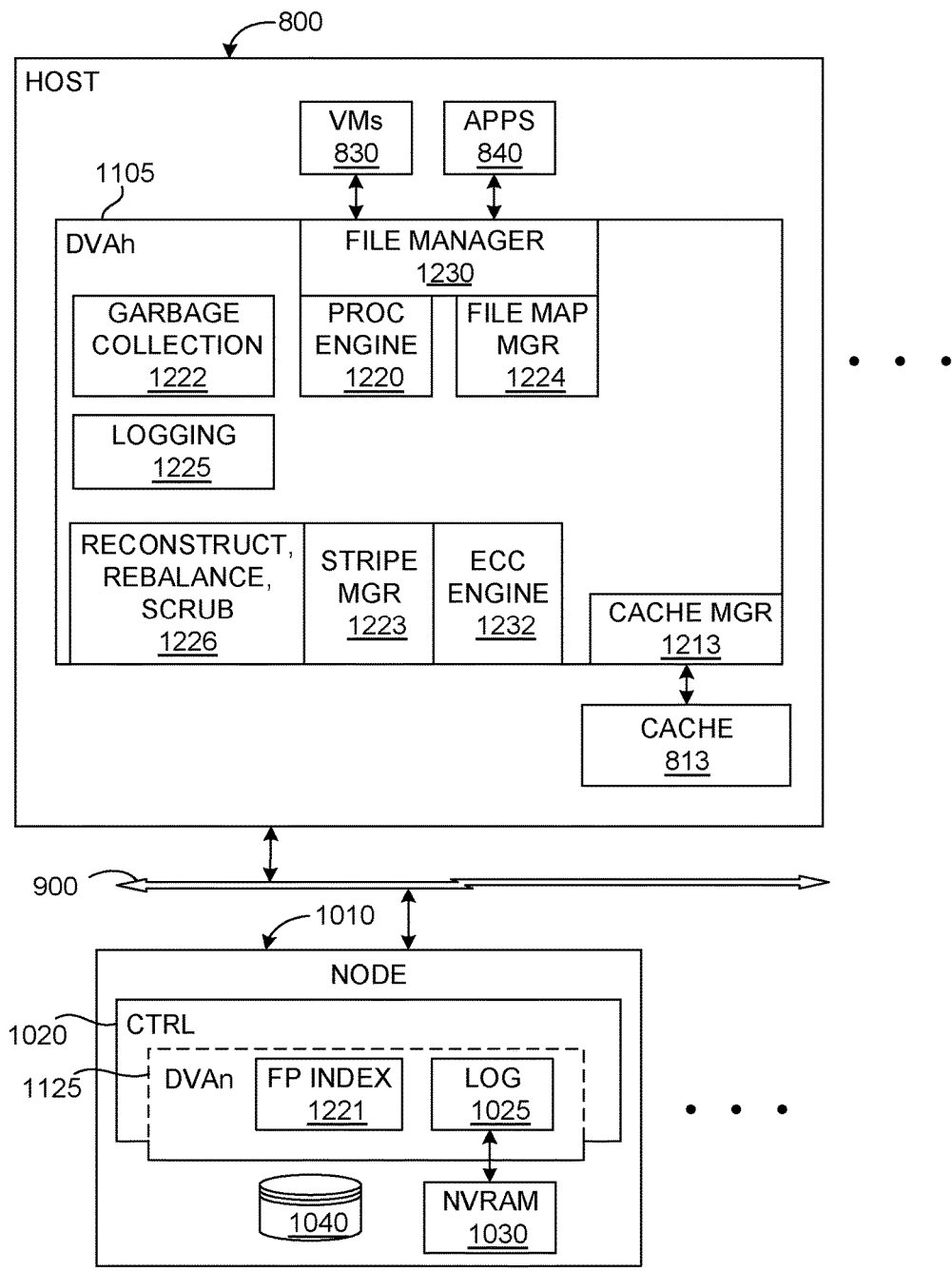
FIG. 9 depicts a detailed embodiment of select components within the DVA.

FIG. 9 is a simplified representation of the main system components shown in FIG. 8, but with more detail of various optional sub-components of the DVA modules. Although only one host and one node are shown, similar sub-components may be included in other hosts/nodes as well. Note that it will not be necessary for all hosts or nodes to include the same DVA sub-components as the one illustrated in FIG. 9; within any given host, any number (from one to all) of the illustrated sub-components may be included, in any desired combination, depending on the needs of any given implementation. The set of DVA sub-components shown in FIG. 9 is therefore for purposes of illustration and explanation only. Furthermore, although the various sub-components are shown as being separate in FIG. 9, this is for purposes of illustration and explanation only—any or all of them could be combined into unitary bodies of executable code.

The DVA sub-components and their functions perform any or all of various storage processing functions, including background storage management functions, data transformation functions, and/or other functions outlined below. Note that on traditional storage systems, these functions are typically performed within the storage controllers and not in the hosts. The DVAh sub-components preferentially include:

A cache manager 1213, which handles reads and writes to the cache 813 using known techniques. In one embodiment, the cache comprises data blocks which have been fingerprinted such that it is possible to find blocks within the cache based on the fingerprint for the block.

A file manager component 1230, which receives data from VMs (or other processes, virtualized or not) on the host and processes it to whichever format has been architected for storage in the pool 1000. It also receives requests to read data and it retrieves data from the cache or pool, processes it to return it to its originally stored format, and returns the requested data. The file manager may invoke other components to help it cache, process, store, or retrieve data.

The file manager 1230 may invoke a mapping module 1224, which updates maps from a file offset to a reference to the corresponding data item stored in the pool 1000. In some embodiments, that data item reference comprises a fingerprint of a block that includes the data item. In some embodiments, the host computes the fingerprint. In some embodiments, the data item reference comprises a locator for the data item. To satisfy a read request for some offset in a file, the file manager invokes the mapping module 1224 to obtain the reference to the data item stored for that offset in the file. It may then use that reference to retrieve the data item from the cache, or, if the data item is not there, it may retrieve the data item from the pool.

As is well known, the storage system of a virtual machine is also virtualized. Processes running on a VM therefore address what they "think" is physical storage, but in fact is a virtual address in a "virtual disk" (vDisk), which then undergoes one or more levels of address redirection using corresponding address maps, leading ultimately to an address in physical space. In the context of a distributed storage system, VM reads and writes are ultimately mapped to the corresponding address in one (or more, for example, if data is mirrored) physical storage devices in the pool 1000.

A Data Processing component—the processing engine 1220—is preferably included to perform any or all of such known data-transforming functions as compression, encryption, checksums to ensure data integrity, packing of received data into erasure-coded stripes, for example, computing error-correcting code (ECC) values as part of RAID stripes, and/or computing fingerprints, that is, unique identifying information for received data blocks. One example of a possible fingerprinting technique is hashing, such as using any of the SHA methods (for example, SHA-1). Assuming that the chosen fingerprinting method is sufficiently collision resistant (that is, the probability of two different inputs yielding the same fingerprint output is sufficiently low), different data blocks having the same fingerprint may then be presumed to have the same content and therefore be duplicates.

In one embodiment, incoming data is fingerprinted and deduplicated by comparing the fingerprint of the incoming block to the fingerprints of the blocks stored in the cache 813, that is, within the host 800; this avoids the need to analyze and dedupe data stored in the pool 1000. Not only does this arrangement allow these computationally intensive tasks to be performed in the usually more powerful host, but it also avoids most of the latency that would otherwise be experienced if the host would first have to retrieve the fingerprint from the more remote storage nodes 1010.

A cache of fingerprinted blocks can also avoid the latency of fetching a data block from the pool in response to a read request. Two distinct files may each include a block with the same content and therefore the same fingerprint. The duplicate block may have been inserted in the cache 813 to satisfy a read or write request for one file and a subsequent read request for the duplicate block in another file may be satisfied from the cache without incurring the latency of fetching the block from the pool.

Fingerprinting or checksums may also be used to ensure data integrity and to detect incomplete writes. For example, fingerprints may be computed for buffered data. If there is any indication of possible host failure and incomplete write, the fingerprint of the present data may be compared with that of the buffered data—if the values are not the same, then the system will know the write was incomplete since the buffered data will not be identical to the data intended to be stored.

In a DVA that uses a log-structured filesystem, a garbage collection module 1222 may be included to perform conventional garbage collection functions including, in some embodiments, identifying data to be copied forward and, in some embodiments, copying such data into new stripes.

In systems in which data is stored using stripes, a stripe manager 1223 may be included. The stripe manager may use or include an ECC engine 1232 to compute ECC values, which it adds to a stripe that it distributes across multiple storage nodes according to whatever mapping or allocation scheme that the designer chooses to implement.

A module 1226 may also be included in the host to perform such functions as data reconstruction (for example, of missing RAID stripe elements from ECC information), data rebalancing, or data scrubbing to ensure data integrity, etc. This module, or one or more other host modules, may also perform such operations as prefetching data into the host flash cache; forming data clumps and deduping at that granularity and then repacking such clumps, handling host flash failures, updating vDisk maps on the host, etc.

The DVAn sub-components may include:

A fingerprint index 1221 to map from fingerprints to data block locators or other identifiers. When a host stores fingerprinted data blocks in stripes and writes the stripes to the pool, it communicates the fingerprints and corresponding data block locators to the fingerprint index. When a host needs to read a fingerprinted block from the pool, it first requests the block locator from the index and then reads the block from the pool. The index 1221 may be implemented in the host but is preferably implemented in the controller 1020—because the size of the index is proportional to the storage capacity, it will generally be most efficient to bundle the memory for the index with its corresponding storage unit.

A log 1025 that receives recently written data and other events from a logging module 1225 on a host and stores that data in a non-volatile, low latency NVRAM module 1030. The NVRAM module 1030 is shown in FIG. 9 as being internal to the node 1010, but this is just one implementation example. Other possibilities include putting the NVRAM module 1030 within a different, dedicated node, or in any other location. By storing recently written data as a log or otherwise in the NVRAM, the write can be acknowledged as "safe" without incurring the latency of a write to a higher-latency device 1040 such as a disk drive. By storing such data external to the host, including the log 1025, if the host fails before storing it to a permanent location in one of the storage devices 1040, another entity (such as one of storage nodes, one of the hosts that has not failed, or any other entity besides the host that originally received data) can read data from non-volatile device 1030 and re-process the data to store it in one of the storage devices 1040. This would not be possible if the only copy of the data were internal to the host in a cache 813 that was only accessible via the now-failed host.

One other advantage of including the NVRAM module 1030 and exposing it to the hosts via an interface such as LOG 1025 is that the host can make the data "safe" by writing it to NVRAM on a storage node allowing quick acknowledgement and then leverage its computing resources for further and possibly delayed storage processing, for example, after enough data is batched to form a stripe, etc. In some embodiments, some of the data written to the NVRAM may never be written to a persistent storage device without further storage processing by host. In some embodiments, the data may be written to multiple NVRAM devices to protect against the failure of one of the NVRAM devices or the controller it is connected to. The host may itself write to multiple NVRAM devices, or a controller may mirror a single host write to multiple NVRAM devices or to a plurality of other controllers and their NVRAM devices either in the same or a different node.

By way of example, assume that a VM wishes to write data to at least one virtualized disk vDisk or file. If the host on which the VM is a guest fails, a copy of the newly written data will survive in the log and NVRAM on some storage node. The Write data may also be buffered in or the file manager or stored in the cache 813 of the VM host until there is enough data to complete some minimum storage unit, such as (for example, in RAID-like systems) a full stripe, before the data is written to the pool, possibly including to one or more storage nodes that did not hold log data for the write. New Write data can also be buffered on the VM host for even longer periods to give time for later overwrites of the same location in a vDisk, which eliminates the need to write out the overwritten data in a stripe. The host—either as part of the DVAh component, or some other host entity, such as in its operating system, may also compute at least one erasure coded block for the Write unit and then write it to a storage node.

If the operation is a READ, the desired data may be looked up in the cache 813. If the data is cached, it may be read from the cache and returned to the requesting process, such as a VM. If the data is not cached, it may be read directly from the storage node (using any intermediate address maps), and returned to the requesting process. The READ data may also be written to the cache.

By concentrating the management and computational burden in the host, the storage nodes can be kept relatively simple, and inexpensive, with no need for dedicated backplanes and fibre channel connections on the storage side; moreover, the entire storage side may communicate with the hosts directly via a standard network connection. Further, if the hosts communicate with the pool, but only infrequently with each other, then one host does not suffer from a noisy neighbor on another host. Finally, if the hosts include a large cache, then they will only infrequently have to contact even nodes in the pool, which further reduces the noisy neighbor problem. Hosts are empowered to serve data to the VMs and applications running within them and so are less susceptible to performance issues elsewhere in the system.

It should be noted that the various functions or processes disclosed herein may be described as data and/or instructions embodied in various non-volatile, computer-readable media, which may be provided as a computer program product to those wishing to implement embodiments of the DVA system.

Figure 10:
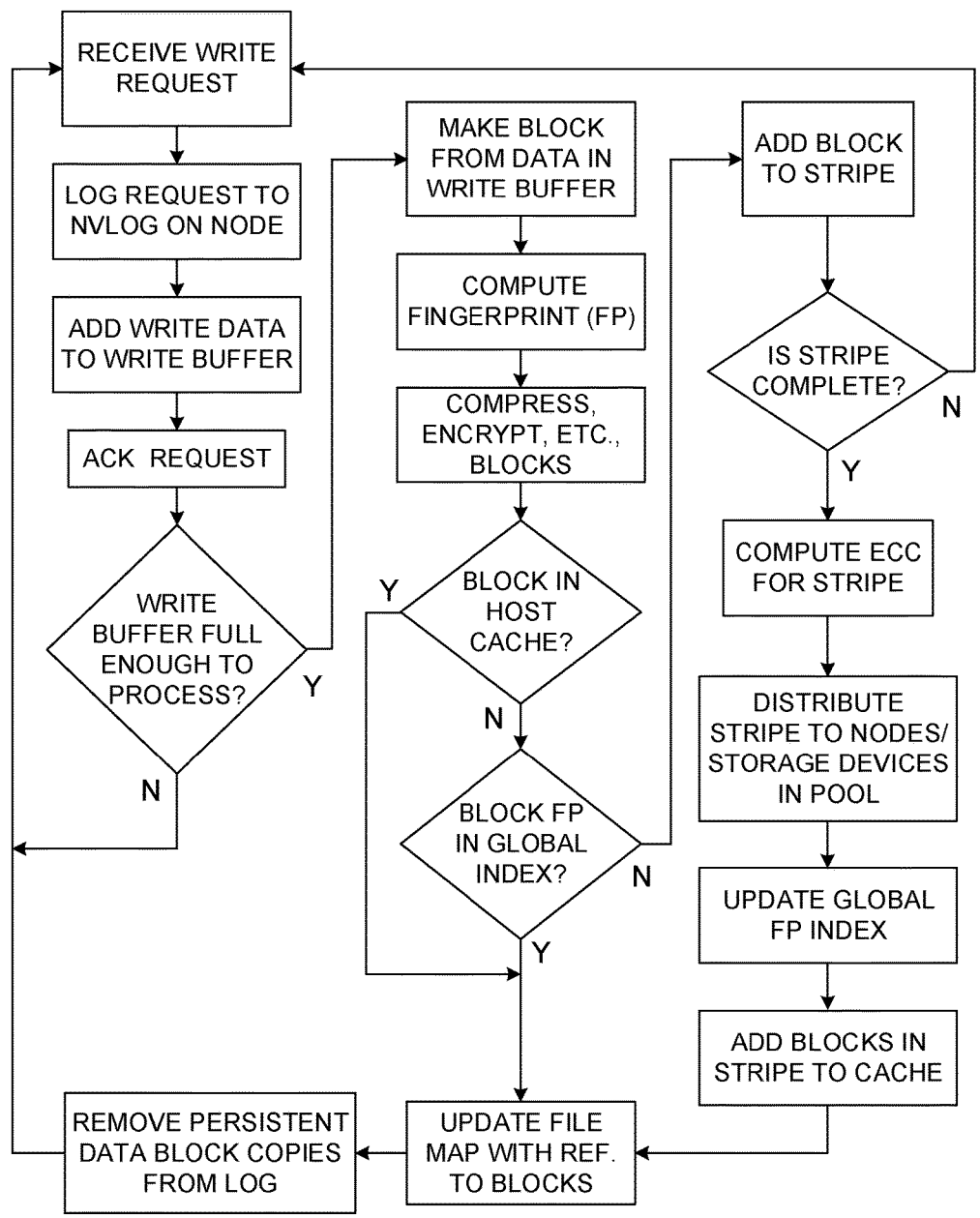
FIG. 10 depicts an embodiment of the workflow upon receipt of write requests.

FIG. 10 illustrates one implementation of processing write requests: When a write request is received, the request is logged to the NVRAM module 1030 on a node. Logging the write includes an indication of the file and offset within the file being written. The write data itself is written to the write buffer and the request is acknowledged. If the write buffer is not full enough to trigger processing, for example, enough to form a block, then the processing will return to receive more write requests; otherwise, the written data may be formed into blocks and one or more fingerprints may be computed (depending on whether a single fingerprint is used for the entire data set or separate fingerprints are used per block). Either before, after, or at the same time as the fingerprint computation, the block data may also be processed, such as by compression, encryption, etc. If a given block is already in the host cache (which can be determined by fingerprint comparison), then a file map may be updated with references to the blocks and the processing may return to receive additional writes. If the block's fingerprint is not found in host cache or the global fingerprint index 1221, the block is added to the stripe currently being constructed. If the stripe is not yet complete, the system may return to receive additional write requests. If the current stripe is complete, an ECC stripe element is computed for it and it can be distributed for storage. The fingerprints for the blocks in the stripe are then added to the global fingerprint index 1221. The blocks can then also be added to the cache, after which, the file map is updated to reference the blocks as stored in the stripe. At this point the written data is safe in the face of a host failure so the temporary copy of the data in the NVRAM is no longer needed. The host, using, for example, the logging module 1225, may therefore communicate to the log 1025 that it may truncate the data and remove it from the NVRAM. Note that the controller need not itself rewrite the data temporarily stored in NVRAM in a more permanent location. Finally, processing returns to receive additional writes. In other embodiments, the DVAh components compute a fingerprint and check for presence of that fingerprint in the host cache and/or global fingerprint index and, for the corresponding file and offset within the file, log to the remote NVRAM only a new reference to previously stored data instead of the data itself before acknowledging the write.

Figure 11:
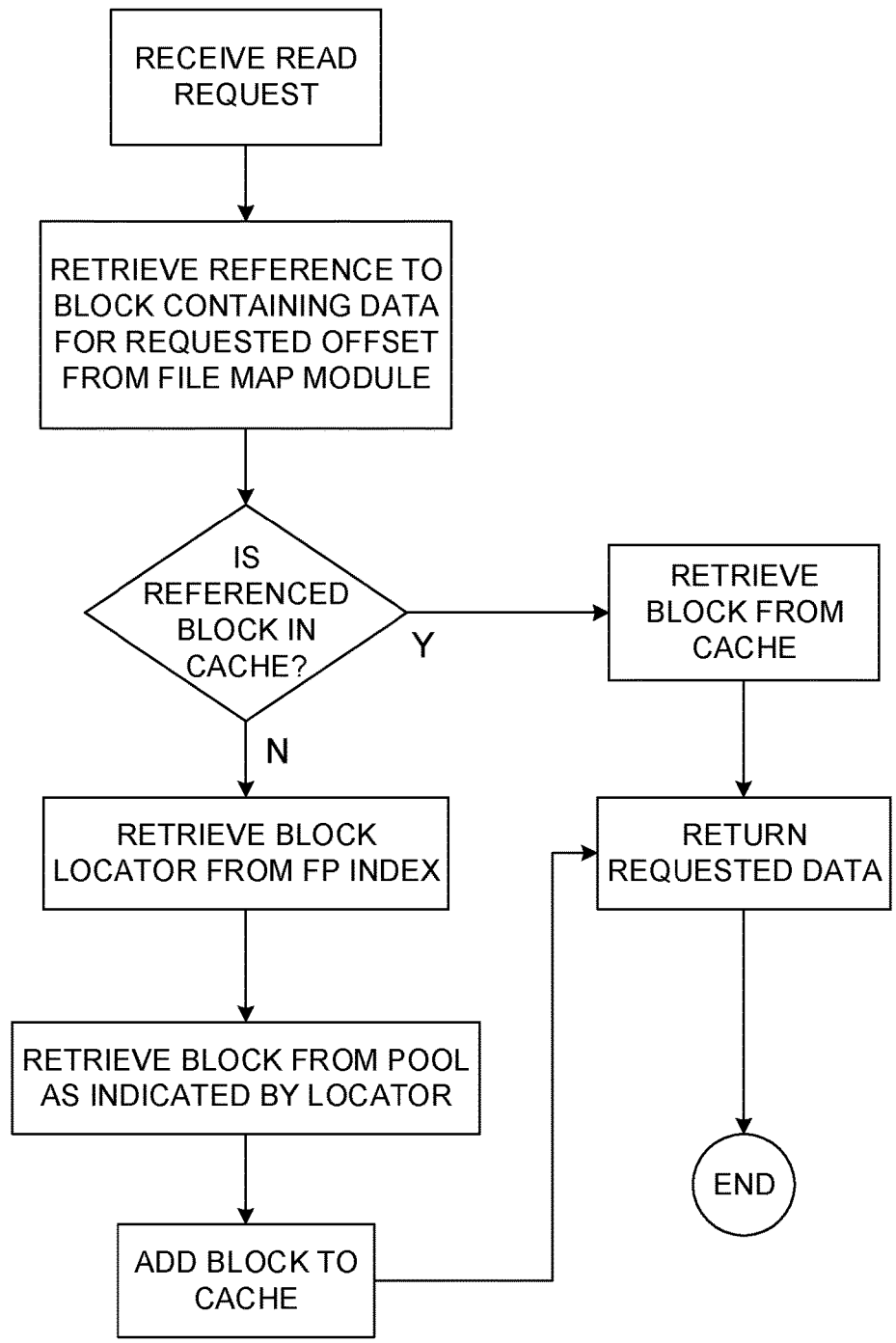
FIG. 11 depicts an embodiment of the workflow upon receipt of read requests.

FIG. 11 illustrates one implementation of processing read requests: A read request is received and the reference to the block containing the data is retrieved from file map module, which will provide the requested offset. If the referenced block is in the cache 813, it may be retrieved and the data can be returned to fulfill the read request. If the block is not in the cache, it must be retrieved from the pool. This can be achieved by retrieving the block locator from the fingerprint index. Once the block is retrieved, it may be added to the cache, and the requested data may be returned.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
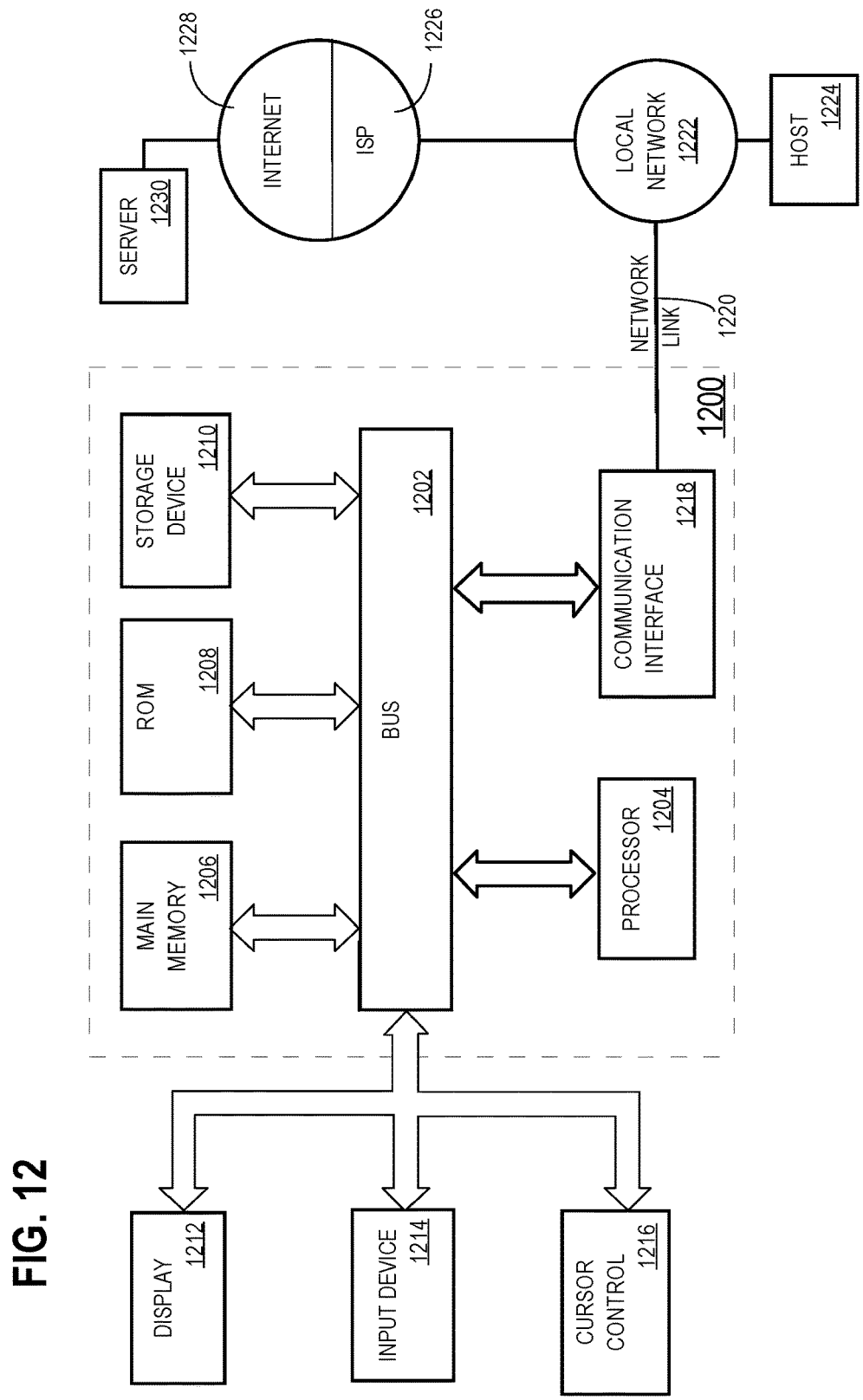
FIG. 12 depicts a block diagram illustrating a computer system that may be used to implement the techniques described herein.

For example, FIG. 12 is a block diagram that illustrates a computer system 1200 upon which an embodiment may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for copying forward live clumps stored in storage regions used by a file system, the method comprising:
    distributing work of identifying storage regions that contain clumps that correspond to live-clump references among a plurality of container-identifying workers based on first work-partitioning criteria;
    during a storage-region-identifying phase, executing the plurality of container-identifying workers to identify a set of storage regions that contain clumps that correspond to a set of live-clump-references;
    wherein live-clump-references are references to clumps that belong to live objects in the file system;
    wherein the plurality of container-identifying workers execute independent of each other;
    wherein each container-identifying worker identifies one or more storage regions that contain clumps that correspond to the set of live-clump-references;
    distributing work of copy-forward operations among a plurality of copy-forward task workers based on second work-partitioning criteria;
    wherein the first work-partitioning criteria is different than the second work-partitioning criteria;
    during a copy-forward phase that occurs after the storage-region-identifying phase, executing the plurality of copy-forward task workers to perform copy-forward operations on the set of storage regions;
    wherein the plurality of copy-forward task workers execute independent of each other; and
    wherein each copy-forward task worker is assigned a subset of storage regions from the set of storage regions, and performs copy-forward operations on the subset of storage regions to which the copy-forward task worker was assigned.

2. The method of claim 1, further comprising:
    during a live-clump-reference-identifying phase that occurs before the storage-region-identifying phase, executing one or more live-clump-identifying workers to identify a set of live-clump-references;
    wherein the one or more live-clump-identifying workers execute independent of each other; and wherein each of the one or more live-clump-identifying workers identifies one or more live-clump-references for clumps that belong to live objects in the file system.

3. The method of claim 2, wherein the clumps that belong to the live objects in the file system are stored within a candidate set of storage regions that include storage regions for which the copy-forward operations are to be performed; and wherein clumps within the candidate set of storage regions have been flushed to persistent storage and mapping for live-clump-references have been generated within metadata within the file system.

4. The method of claim 3, further comprising:
during a live-object-identifying phase that occurs before the live-clump-reference-identifying phase, executing one or more live-object-identifying workers to identify a set of live objects;
wherein the one or more live-object-identifying workers execute independent of each other; and
wherein each of the one or more live-object-identifying workers identifies one or more live objects in the file system based upon namespace metadata in the file system.

5. The method of claim 1, further comprising:
during a storage-region-scoring phase, which occurs after the storage-region-identifying phases and before the copy-forward phase, executing a plurality of storage-region-scoring task workers to assign a priority score to each storage region within the set of storage regions based upon at least one storage region attribute of: an expected lifetime value for live clumps within the storage region, total number of the live clumps within the storage region, or total size of the live clumps; and
wherein the plurality of storage-region-scoring task workers execute independent of each other.

6. The method of claim 1, wherein the copy-forward operations performed by each copy-forward task worker comprises:
copying the live clumps, that correspond to live-clump-references within the set of live-clump-references that are within the subset of storage regions to which the copy-forward task worker was assigned, to a new storage region; and
upon completion of copying the live clumps to the new storage region, deleting the subset of storage regions to which the copy-forward task worker was assigned.

7. The method of claim 1, wherein at least two of the plurality of copy-forward task workers execute in parallel.

8. The method of claim 1, wherein at least two of the plurality of container-identifying workers execute in parallel.

9. A method for copying forward live clumps stored in storage regions used by a file system, the method comprising:
during a first phase, a plurality of first phase task workers performing the steps of:
identifying live-objects in the file system;
distributing work to a plurality of second phase task workers based on work partitioning criteria comprising identifiers of the live-objects;
the second phase task workers performing the steps of:
identifying live-clump-references for the live-objects identified by the first phase task workers;
distributing work to a plurality of third phase task workers based on work partitioning criteria comprising values of the live-clump-references;
the third phase task workers determining storage regions that correspond to the live-clamp-references identified by the second phase task workers; and
distributing work to a plurality of copy-forward task workers based on work partitioning criteria comprising the storage regions to which the live-clump-references belong.

10. The method of claim 9, wherein identifying the live-objects in the file system further comprises:
determining storage regions that belong to a candidate set of storage regions by generating a candidate set boundary that delineates between storage regions that are part of the candidate set of storage regions from other storage regions not part of the candidate set of storage regions;
wherein the candidate set of storage regions contain the live clumps that belong to the live-objects in the file system;
wherein the candidate set boundary divides storage regions into a first set of storage regions that may still receive write requests, and a second set of storage regions that no longer receives write requests; and
wherein the second set of storage regions belong to the candidate set of storage regions.

11. The method of claim 10, wherein the candidate set of storage regions contains clumps that have been flushed to persistent storage and live-clump-references have been generated within metadata within the file system.

12. The method of claim 9, wherein distributing work to the third phase task workers based on values of the live-clump-references comprises assigning each third phase task worker of the third phase task workers a subset of live-clump-references that are within a contiguous range of live-clump-references.

13. The method of claim 9, wherein distributing work to copy-forward task workers comprises:
generating a storage region-to-live-clump-mapping between the live-clump-references and the storage regions, wherein the storage region-to-live-clump-mapping maps the storage regions to the live-clump-references, such that the storage region-to-live-clump-mapping may be sorted based upon the storage regions;
sorting the storage region-to-live-clump-mapping based upon the storage regions; and
distributing work to the copy-forward task workers based on the storage regions and the storage region-to-live-clump-mapping.

14. The method of claim 13, wherein distributing work to the copy-forward task workers is further based upon a priority score calculated for each storage region; and
wherein the priority score is based upon at least one storage region attribute of: an expected lifetime value for live-clump-references within the storage region, a total number of the live-clump-references within the storage region, and a total size of the live-clump-references.

15. A non-transitory computer-readable medium that stores instructions for copying forward live clumps stored in storage regions used by a file system which, when executed by one or more processors, cause performance of:
distributing work of identifying storage regions that contain clumps that correspond to live-clump references among a plurality of container-identifying workers based on first work-partitioning criteria;
during a storage-region-identifying phase, executing the plurality of container-identifying workers to identify a set of storage regions that contain clumps that correspond to a set of live-clump-references;
wherein live-clump-references are references to clumps that belong to live objects in the file system;
wherein the plurality of container-identifying workers execute independent of each other;
wherein each container-identifying worker identifies one or more storage regions that contain clumps that correspond to the set of live-clump-references;
distributing work of copy-forward operations among a plurality of copy-forward task workers based on second work-partitioning criteria;
wherein the first work-partitioning criteria is different than the second work-partitioning criteria;
during a copy-forward phase that occurs after the storage-region-identifying phase, executing the plurality of copy-forward task workers to perform copy-forward operations on the set of storage regions;
wherein the plurality of copy-forward task workers execute independent of each other; and
wherein each copy-forward task worker is assigned a subset of storage regions from the set of storage regions, and performs copy-forward operations on the subset of storage regions to which the copy-forward task worker was assigned.

16. The non-transitory computer-readable medium of claim 15, further comprising instructions which, when executed by one or more processors, cause performance of:
during a live-clump-reference-identifying phase that occurs before the storage-region-identifying phase, executing one or more live-clump-identifying workers to identify a set of live-clump-references;
wherein the one or more live-clump-identifying workers execute independent of each other; and
wherein each of the one or more live-clump-identifying workers identifies one or more live-clump-references for clumps that belong to live objects in the file system.

17. The non-transitory computer-readable medium of claim 16, wherein the clumps that belong to the live objects in the file system are stored within a candidate set of storage regions that include storage regions for which the copy-forward operations are to be performed;
wherein clumps within the candidate set of storage regions have been flushed to persistent storage and mapping for live-clump-references have been generated within metadata within the file system.

18. The non-transitory computer-readable medium of claim 17, further comprising instructions which, when executed by one or more processors, cause performance of:
during a live-object-identifying phase that occurs before the live-clump-reference-identifying phase, executing one or more live-object-identifying workers to identify a set of live objects;
wherein the one or more live-object-identifying workers execute independent of each other; and
wherein each of the one or more live-object-identifying workers identifies one or more live objects in the file system based upon namespace metadata in the file system.

19. The non-transitory computer-readable medium of claim 15, further comprising instructions which, when executed by one or more processors, cause performance of:
during a storage-region-scoring phase, which occurs after the storage-region-identifying phases and before the copy-forward phase, executing a plurality of storage-region-scoring task workers to assign a priority score to each storage region within the set of storage regions based upon at least one storage region attribute of: an expected lifetime value for live clumps within the storage region, total number of the live clumps within the storage region, and total size of the live clumps; and
wherein the plurality of storage-region-scoring task workers execute independent of each other.

20. The non-transitory computer-readable medium of claim 15, wherein the copy-forward operations performed by each copy-forward task worker comprises:
copying the live clumps, that correspond to live-clump-references within the set of live-clump-references that are within the subset of storage regions to which the copy-forward task worker was assigned, to a new storage region; and
upon completion of copying the live clumps to the new storage region, deleting the subset of storage regions to which the copy-forward task worker was assigned.

21. The non-transitory computer-readable medium of claim 15, wherein at least two of the plurality of copy-forward task workers execute in parallel.

22. The non-transitory computer-readable medium of claim 15, wherein at least two of the plurality of container-identifying workers execute in parallel.

23. A non-transitory computer-readable medium that stores instructions for copying forward live clumps stored in storage regions used by a file system which, when executed by one or more processors, cause performance of:
during a first phase, a plurality of first phase task workers performing the steps of:
identifying live-objects in the file system;
distributing work to a plurality of second phase task workers based on work partitioning criteria comprising identifiers of the live-objects;
the second phase task workers performing the steps of:
identifying live-clump-references for the live-objects identified by the first phase task workers;
distributing work to a plurality of third phase task workers based on work partitioning criteria comprising values of the live-clump-references;
the third phase task workers determining storage regions that correspond to the live-clump-references identified by the second phase task workers; and
distributing work to a plurality of copy-forward task workers based on work partitioning criteria comprising the storage regions to which the live-clump-references belong.

24. The non-transitory computer-readable medium of claim 23, wherein identifying the live-objects in the file system further comprises:
determining storage regions that belong to a candidate set of storage regions by generating a candidate set boundary that delineates between storage regions that are part of the candidate set of storage regions from other storage regions not part of the candidate set of storage regions;
wherein the candidate set of storage regions contain the live clumps that belong to the live-objects in the file system;
wherein the candidate set boundary divides storage regions into a first set of storage regions that may still receive write requests, and a second set of storage regions that no longer receives write requests; and
wherein the second set of storage regions belong to the candidate set of storage regions.

25. The non-transitory computer-readable medium of claim 24, wherein the candidate set of storage regions contains clumps that have been flushed to persistent storage and live-clump-references have been generated within metadata within the file system.

26. The non-transitory computer-readable medium of claim 23, wherein distributing work to the third phase task workers based on values of the live-clump-references comprises assigning each third phase task worker of the third phase task workers a subset of live-clump-references that are within a contiguous range of live-clump-references.

27. The non-transitory computer-readable medium of claim 23, wherein distributing work to copy-forward task workers comprises:
generating a storage region-to-live-clump-mapping between the live-clump-references and the storage regions, wherein the storage region-to-live-clump-mapping maps the storage regions to the live-clump-references, such that the storage region-to-live-clump-mapping may be sorted based upon the storage regions;
sorting the storage region-to-live-clump-mapping based upon the storage regions; and
distributing work to the copy-forward task workers based on the storage regions and the storage region-to-live-clump-mapping.

28. The non-transitory computer-readable medium of claim 27, wherein distributing work to the copy-forward task workers is further based upon a priority score calculated for each storage region; and
wherein the priority score is based upon at least one storage region attribute of: an expected lifetime value for live-clump-references within the storage region, a total number of the live-clump-references within the storage region, or a total size of the live-clump-references.

29. The method of claim 1, wherein distributing the work of identifying storage regions that contain clumps that correspond to live-clump references among a plurality of container-identifying workers based on first work-partitioning criteria comprises:
receiving a set of range-based partitions, wherein the range-based partitions are generated using clump fingerprints as a partitioning key;
consolidating and repartitioning the partitions to generate a new set of partitions that are equally sized; and
assigning each new partition in the set of equally sized partitions to a container-identifying worker.

30. The method of claim 1, wherein distributing the work of copy-forward operations among a plurality of copy-forward task workers based on second work-partitioning criteria comprises:
receiving a set of score-based partitions, wherein the score based partitions are generated using scores assigned to partitions based on attributes of live-clumps in the partitions; and
assigning partitions to copy-forward workers based on the assigned scores.

* * * * *